US011178143B2

(12) United States Patent
Xu

(10) Patent No.: US 11,178,143 B2
(45) Date of Patent: Nov. 16, 2021

(54) SYSTEM, METHOD AND APPARATUS FOR DEVICE AUTHENTICATION

(71) Applicant: BANMA ZHIXING NETWORK (HONGKONG) CO., LIMITED, Kowloon (HK)

(72) Inventor: Jun Xu, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 249 days.

(21) Appl. No.: 15/953,074

(22) Filed: Apr. 13, 2018

(65) Prior Publication Data

US 2019/0116179 A1    Apr. 18, 2019

Related U.S. Application Data

(63) Continuation-in-part of application No. PCT/CN2016/101538, filed on Oct. 9, 2016.

(30) Foreign Application Priority Data

Oct. 14, 2015    (CN) .......................... 201510660391.4

(51) Int. Cl.
*H04L 29/06* (2006.01)
*H04L 9/08* (2006.01)
(Continued)

(52) U.S. Cl.
CPC .......... *H04L 63/0876* (2013.01); *H04L 9/083* (2013.01); *H04L 9/0825* (2013.01);
(Continued)

(58) Field of Classification Search
CPC .............. H04L 63/0876; H04L 9/3226; H04L 9/083; H04L 63/126; H04L 63/0442; H04L 9/3213; H04L 9/3073; H04L 9/0866; H04L 9/0825; H04L 67/10; H04L 63/083; H04W 12/001; H04W 12/00512; H04W 12/04033; H04W 12/04031
See application file for complete search history.

(56) References Cited

U.S. PATENT DOCUMENTS 6,823,454 B1 * 11/2004 Hind ................. H04L 29/12066
                                                              713/168
7,373,515 B2    5/2008 Owen
7,986,816 B1    7/2011 Hoanca
(Continued)

FOREIGN PATENT DOCUMENTS

CN    102750496    10/2012
CN    104348620    2/2015
CN    103312678    9/2016

*Primary Examiner* — Michael Pyzocha
(74) *Attorney, Agent, or Firm* — Van Pelt, Yi & James LLP

(57) ABSTRACT

An authentication method including: receiving a service request from a terminal device to access a service, the service request including authentication information; transmitting the authentication information to a security platform, the security platform being configured to verify whether the authentication information is originated from a legitimate terminal device and to transmit a verification result based on the verification; and in response to receiving the verification result from the security platform, determine whether to allow the terminal device to access the service.

20 Claims, 13 Drawing Sheets

(51) Int. Cl.
  *H04L 9/32*     (2006.01)
  *H04W 12/03*    (2021.01)
  *H04W 12/0431*  (2021.01)
  *H04W 12/0433*  (2021.01)
  *H04L 9/30*     (2006.01)
  *H04W 12/71*    (2021.01)

(52) U.S. Cl.
  CPC .......... *H04L 9/0866* (2013.01); *H04L 9/3073* (2013.01); *H04L 9/3213* (2013.01); *H04L 9/3226* (2013.01); *H04L 63/0442* (2013.01); *H04L 63/126* (2013.01); *H04W 12/03* (2021.01); *H04W 12/0431* (2021.01); *H04W 12/0433* (2021.01); *H04W 12/71* (2021.01)

(56) References Cited

U.S. PATENT DOCUMENTS

| | | | |
|---|---|---|---|
| 8,286,227 B1 | 10/2012 | Zheng | |
| 8,365,258 B2 | 1/2013 | Dispensa | |
| 9,419,799 B1 * | 8/2016 | Chung | H04L 63/083 |
| 9,660,985 B2 * | 5/2017 | Cao | H04L 63/0853 |
| 10,333,903 B1 * | 6/2019 | Campagna | H04L 63/061 |
| 2012/0144457 A1 * | 6/2012 | Counterman | H04L 9/3247 726/5 |
| 2013/0254119 A1 * | 9/2013 | Hayhow | G06Q 20/3829 705/71 |
| 2013/0269020 A1 * | 10/2013 | Griffin | H04L 63/0861 726/9 |
| 2014/0047133 A1 * | 2/2014 | O'Connor | G06F 21/10 710/3 |
| 2014/0108804 A1 * | 4/2014 | Kanungo | H04L 9/3271 713/170 |
| 2014/0157394 A1 | 6/2014 | Koonjbearry | |
| 2014/0161258 A1 * | 6/2014 | Yang | H04W 12/0401 380/270 |
| 2014/0201518 A1 * | 7/2014 | Yao | H04L 9/0891 713/155 |
| 2014/0282821 A1 * | 9/2014 | Adler | G06F 21/44 726/1 |
| 2014/0286321 A1 * | 9/2014 | Balian | H04W 84/12 370/338 |
| 2015/0381368 A1 * | 12/2015 | Stevens, Jr. | H04L 63/126 705/40 |
| 2016/0112203 A1 * | 4/2016 | Thom | G06F 21/53 713/176 |
| 2016/0285635 A1 * | 9/2016 | Kolesnikov | H04L 63/0428 |
| 2017/0006006 A1 * | 1/2017 | Rawcliffe | H04L 67/10 |
| 2017/0099148 A1 * | 4/2017 | Ochmanski | H04L 63/083 |
| 2020/0195641 A1 * | 6/2020 | Trivelpiece | H04W 4/70 |

\* cited by examiner

SYSTEM, METHOD AND APPARATUS FOR DEVICE AUTHENTICATION

CROSS REFERENCE TO OTHER APPLICATIONS

This application is a continuation-in-part and claims priority to International (PCT) Application No. PCT/CN16/101538 entitled SERVICE AUTHENTICATION METHOD, APPARATUS AND SYSTEM, filed Oct. 9, 2016 which is incorporated herein by reference in its entirety for all purposes, which claims priority to China Application No. 201510660391.4 entitled A METHOD, MEANS, AND SYSTEM FOR BUSINESS SERVICE AUTHENTICATION, filed Oct. 14, 2015 which is incorporated herein by reference in its entirety for all purposes.

FIELD OF THE INVENTION

The present invention generally relates to the field of computer communication technology and more particularly, to a system, method, and apparatus for device authentication.

BACKGROUND OF THE INVENTION

Nowadays, the Internet is the popular network on which volumes of communication, data exchange, transactions are conducted with various service providers such as e-commerce retailers, smart home automation service provider, personal medical alert service provider, and the like. In connection with service providing, most service providers perform identify authentication. Presently, the most common approach of identity authentication is directed at user identities. For instance, a user first registers an account with a service provider and later logs into the account to access the subscribed to services at a terminal device. In order to transact with the service provider, the terminal device is configured to furnish the user account information to the service provider in a request for access. The service provider in turn authenticates the user based on whether the received user account information matches with the user account information registered with the service provider. If the user's identity is authenticated as legitimate, the service provider continues to transact with the terminal device and allow the user at the terminal device to access the requested service. This way, it is ensured that the user is in fact authorized to access the requested service, or to use the account from which payment is to be made.

The development of smart devices (e.g., IoT devices) has given rise to more and more services independent from user's control and involvement. For instance, illegitimate devices such as a counterfeit terminal device or a device that is otherwise tampered can attempt to gain access and transact services.

Therefore, a need exists to authenticate device identity such that only legitimate devices are permitted to gain access to the services intended therefor, and illegitimate devices are blocked from access.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to further clarify the goals, technical schemes, and advantages of the present invention, the present invention is described in detail below in light of the drawings and specific embodiments.

Figure 1:
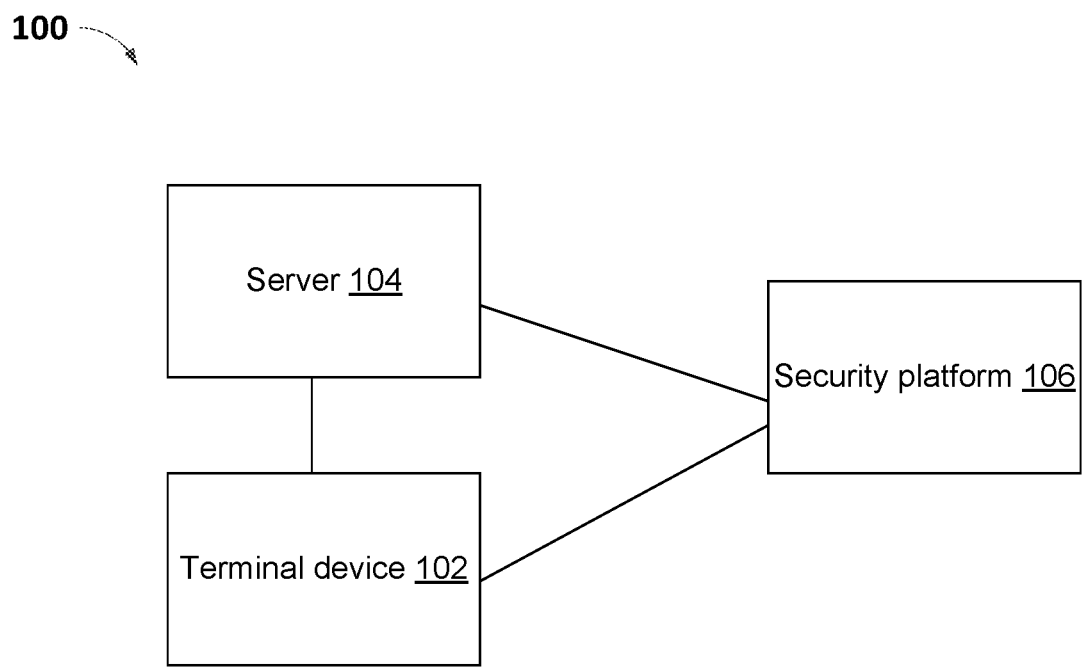
FIG. 1 is a schematic diagram illustrating an example system for device authentication, in accordance with one or more embodiments of the present disclosure.

FIG. 1 is a schematic diagram illustrating an example system for device authentication, in accordance to an embodiment of the present disclosure. System 100 includes a terminal device 102, a service providing server 104, and a security platform 106. Terminal device 102 gains access to the service provided by the service provider via server 104, which consults security platform 106 in order to authenticate terminal device. Communication between terminal device 102, server 104, and security platform 106 can be implemented via a wired and/or wireless communication network such as the Internet, an intranet, a Bluetooth network, a LAN, a WAN, etc. For simplicity of illustration, only one terminal device 102, one server 104, and one security platform 106 are shown herein. It should be understood that system 100 can include any number of terminal device 102, any number of server 104, and any number of security platform 106, in connection with any number of services provided. Terminal device 102, server 104, and a security platform 106 can be implemented by, for example, a computing system 1300 of FIG. 13.

Server 104 is configured to provide and maintain services for one or more service providers. Service providers include, for example, banks or financial institutions, credit card companies, insurance companies, e-commerce retails, government agencies, home security providers, home automation providers, IoT network based service provider, and the like. Server 104 is configured to, in addition to its core competence of servicing specific services in response to requests from terminal device 102, perform the following functionalities to authenticate device identities.

Server 104 is configured to receive a service request transmitted from terminal device 102. In this example, the service request includes the authentication information corresponding to terminal device 102.

Server 104 is also configured to transmit the received authentication information to security platform 106, and to receive the authentication result with regard to the identity of terminal device 102 returned from security platform 106.

Server 104 is further configured to determine, based on the authentication result, whether to allow terminal device 102 to access the requested service.

Security platform 106 is configured to reside in a network, and can be implemented at a single server or a multiple servers connected to the network.

Security platform 106 is configured to receive the authentication information transmitted from server 104, and to verify whether the received authentication information matches with any of those of the legitimate terminal devices. If so, security platform 106 determines terminal device 102 as successfully authenticated. Otherwise, security platform 106 determines terminal device 102 as unauthenticated. In this example, the verification is performed by comparing the received authentication information against a local storage or database containing device identifiers unique to individual devices. In some embodiments, server 104 is configured to maintain unique device identification information in databases remote from server 104, or implemented at distributed computing resources, or in a cloud infrastructure. In some embodiments, security platform 106 is configured with permission to consult databases of device identifiers maintained by other entities such as those specialized in maintaining records of device identifiers and/or other like information.

Security platform 106 is further configured to transmit the verification result to server 104. The verification result is configured to indicate terminal device 102 as successfully authenticated or unauthenticated. In this example, security platform 106 is further configured to generate unique device identifiers for legitimate devices, and thereby to maintain device identifiers corresponding to legitimate devices in a local storage or local database.

Terminal device 102 is configured to, when requesting for access to the service provided at server 104, retrieve the authentication information and include the authentication information along with the service request transmitted to server 104. In some embodiments, terminal device 102 is configured to execute an application or a software program to read the device identifier.

According to various embodiments of the present disclosure, terminal device 102 can be any device, or a component device of a composite device having multiple components, or the like. For example, terminal device 102 can include a mobile phone, computer, smart household device, wearable device, smart medical device, in-vehicle device, etc. A mobile phone device can include, for example, a smart phone or a conventional flip-phone. A computer device can include, for example, a server computer, a personal computer, a notebook computer, a tablet computer, and the like. A smart household device can include, for example, a smart television set, a smart air-conditioning system, a smart humidifier, a smart water heater, a smart kitchen appliance, a mart ventilation system (e.g. a smart door and a smart window), a smart air purifier, a smart home security system, and the like. A wearable device can include, for example, a smart watch, a pair of smart glasses, a smart wrist-band, a piece of smart clothing, smart shoes, smart accessories, and the like. A smart medical device can include, for example, a smart blood pressure gauge, a smart bodyweight scale, a smart blood sugar meter, a smart massage seat, a smart bio-metrics monitor, and the like. An in-vehicle device can include, for example, a smart on-board information system for traffic information, cellular communication, vehicle diagnosis, navigation system, warning system, emergency system, entertainment system, and the like.

Figure 2:
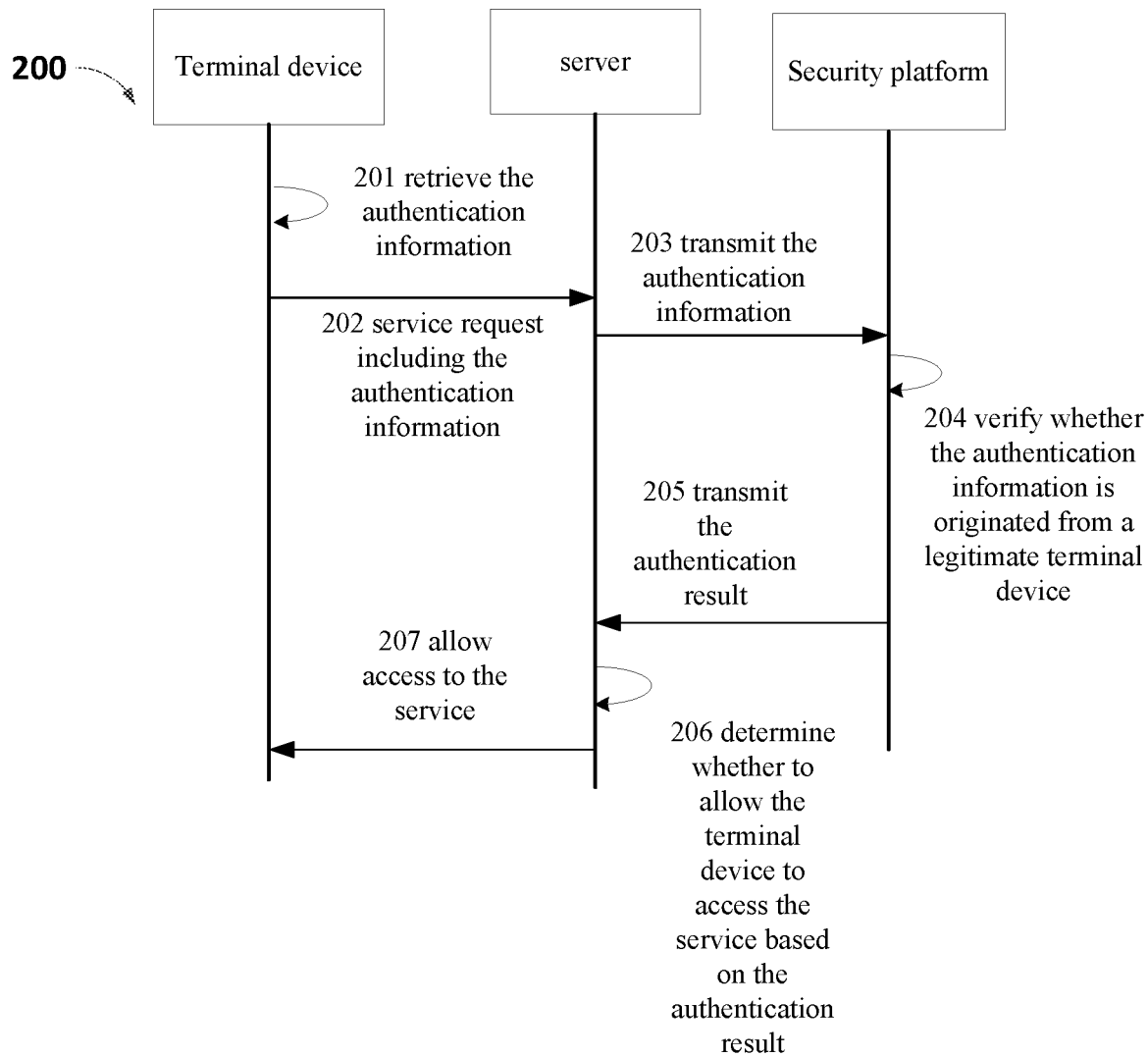
FIG. 2 is a flowchart illustrating an example process for device authentication, in accordance with one or more embodiments of the present disclosure.

FIG. 2 illustrates a flowchart of an example process for device authentication in accordance with an embodiment of the present disclosure. Process 200 can be implemented by, for example, system 100 of FIG. 1.

Process 200 starts at 201, where a terminal device is configured to obtain the authentication information corresponding to the terminal device upon requesting to access the service provided at a server.

In this example, the authentication information corresponding to the terminal device comprises a unique device identifier recorded into the terminal device. In some embodiments, the authentication information can include any type of information that uniquely identify the corresponding terminal device.

Additionally, for the purpose of enhanced security, the terminal device is configured to encrypt the device identifier with a pre-configured encryption key information, and to include the encrypted device identifier as the authentication information in the service request. In some embodiments, the encryption key information is provided to the terminal device by a security platform in advance. For example, the security platform generates encryption key information and transmits the encryption key information along with the unique device identifier assigned to the terminal device. In turn, the terminal device is recorded with both the unique device identifier and the encryption key information permanently. Relevant details are described in further details in below.

At 202, the terminal device transmits a service request including the afore-described authentication information to the server at which the service is provided.

In some embodiments, the terminal device transmits the above-described service request directly to the server. In some embodiments, when the terminal device is of a type such as a wearable device without any direct communication to a network on which the server is in communication with, near-field communication (NFC), Bluetooth, or infrared network, and the like can be used to transmit the service request to a device paired with the terminal device. Such device can include, for example, a mobile phone or a home server or a tablet computer. Subsequently, the device paired with the terminal device relays the service request to the server.

At 203, the server is configured to transmit the received authentication information to a security platform. In some embodiments, the server is further configured to keep track of the terminal devices that have been successfully authenticated by the security platform in the past. If the server finds an entry in the record of those already authenticated devices matching the authentication information included in a pending service request, the server can automatically determine that the terminal device is legitimate based on the authentication history. In some embodiments, when the terminal device transmits the service request to the server for the first time, or the terminal device is configured with the requirement to be authenticated repeatedly at regular intervals (e.g., periodical re-authentication requirement), the server forwards the authentication information to the security platform for verification.

At 204, the security platform is configured to verify whether the received authentication information is originated from a legitimate terminal device. In this example, unique device identifiers corresponding to legitimate terminal devices can be locally stored on the security platform. In some embodiments, unique device identifiers corresponding to legitimate terminal devices can be stored at any suitable location. Here, it is determined whether the unique device identifier included in the received authentication information matches with any device identifiers that have been locally stored. In other words, it can be determined whether the unique device identifier included in the authentication information is locally stored at the security platform. If so, the authentication information is determined as being originated from a legitimate terminal device. Otherwise, the authentication information is determined to being originated from an illegitimate terminal device. This way, the legitimacy of the terminal device is verified and authenticated.

In some embodiments where the authentication information is transmitted as encrypted data, the security platform is configured to decrypt the received encrypted authentication information with the encryption key information to obtain the decrypted authentication information, e.g., unique device identifier of the terminal device. Afterwards, the security platform performs the verification of the decrypted authentication information as described above, and details are not repeated herein for simplicity of illustration.

In some embodiments, the security platform is configured to employ a symmetrical encryption algorithm. In this case, the afore-described encryption key information is a secret encryption key, which is generated by the security platform and provided to the legitimate terminal device in advance. In some embodiments, the security platform is configured to employ an asymmetrical algorithm. In this case, the security platform pre-generates a public-private key pair using known techniques such as a cryptography library, then maintains the private key of the public-private key pair thereat, and provides the public key of the public-private key pair to a legitimate terminal device. To decrypt, the private key of the public-private key pair is used to decrypt the authentication information encrypted with the public key of the key pair by the terminal device. Alternatively, the security platform provides the private key of the public-private key pair to a legitimate terminal device. To decrypt, the public key of the public-private key pair is utilized by the security platform to decrypt the encrypted authentication information.

At 205, the security platform transmits the verification result back to the server.

At 206, the server is configured to determine whether to provide the services to the terminal device (e.g., allow the terminal device to access the service) based on the received verification result. If the verification result indicates that the authentication information as being originated from a legitimate terminal device, e.g., the terminal device which has sent the service request is a legitimate device, the server is configured to provide the service to the terminal device at 207. Otherwise, the server is configured to deny the terminal device from accessing the service.

As illustrated in the above examples, this way, the server is enabled to control the access to the services provided thereat by verifying the legitimacy of terminal devices that intend to access the services.

In some embodiments, the above-described unique device identifier corresponding to the terminal device is generated by the security platform, and then recorded into the terminal device by an identifier recording apparatus. In other words, the generating and maintenance of unique device identifiers of terminal devices are both performed by the security platform at a network. This way, only unique device identifiers generated by the security platform are considered as valid and legitimate identifiers, which provides for a basis for device authentication. For the purpose of illustration, the generating of unique device identifiers is described in further details with reference to FIGS. 3-5 in below.

Figure 3:
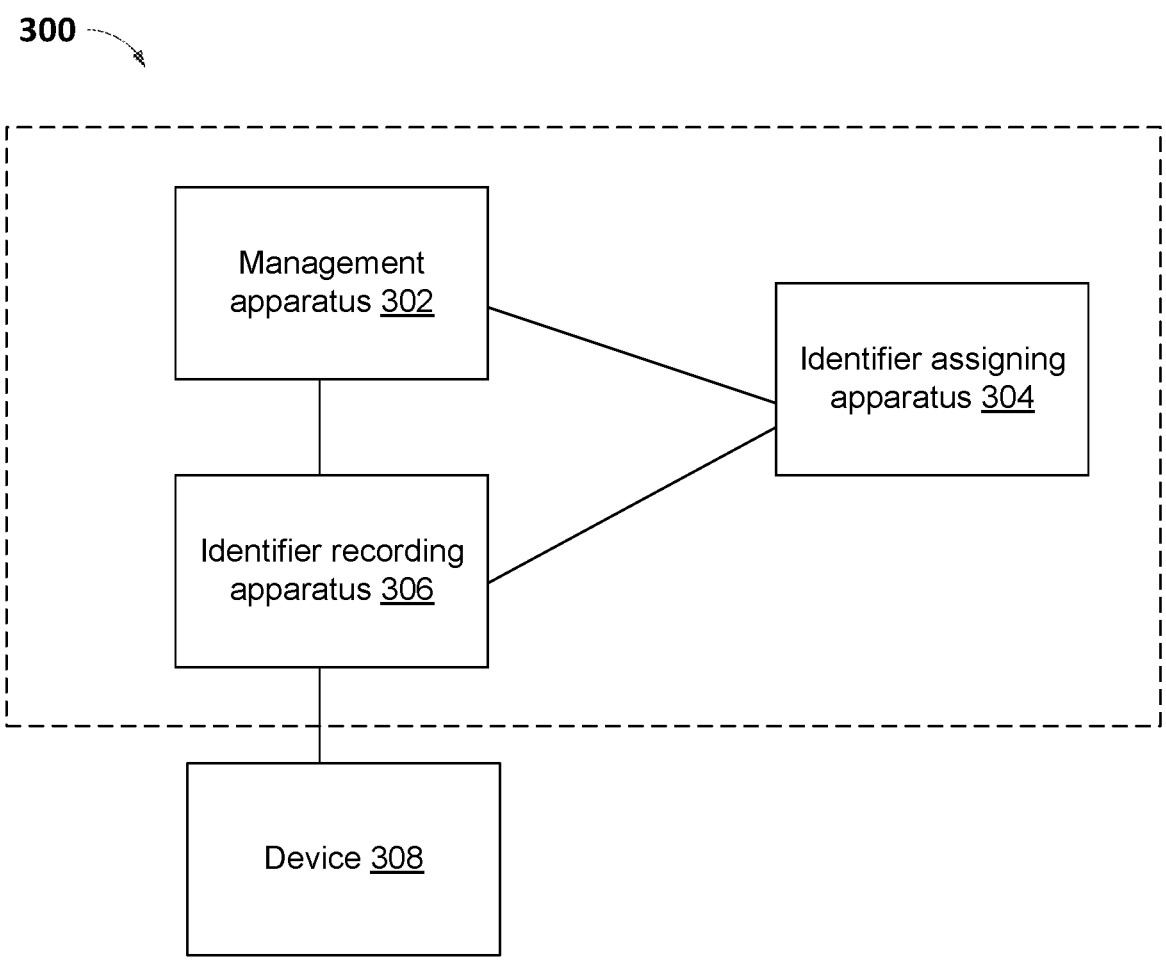
FIG. 3 is a schematic diagram of an example system for generating device identifiers, in accordance with one or more embodiments of the present disclosure.

FIG. 3 illustrates a schematic diagram of an example system for generating device identifiers, according to an embodiment of the present disclosure. System 300 includes a management apparatus 302, an identifier assigning apparatus 304, and an identifier recording apparatus 306. Also shown herein is a device 308, which is to be assigned and recorded with an identifier assigned by system 300 by identifier recording apparatus 306. Management apparatus 302, identifier assigning apparatus 304, and identifier recording apparatus 306 are in communication with each other via a wired and/or wireless communication network such as the Internet, an intranet, a LAN, a WAN, etc. In some embodiments, management apparatus 302 can be configured to be only in communication with identifier assigning apparatus 306. For simplicity of illustration, only one management apparatus 302, one identifier assigning apparatus 304, one identifier recording apparatus 306, and one device 308 are shown herein. It should be understood that system 300 can include any number of management apparatus 302, any number of identifier assigning apparatus 304, any number of identifier recording apparatus 306, and can assign identifiers to any number of device 308. Management apparatus 302, identifier assigning apparatus 304, and identifier recording apparatus 306 can be implemented by, for example, one or more computing systems such as 1300 of FIG. 13.

In this example, management apparatus 302 is configured to locate on the side of the manufacturer of device 308, and therefore can also be termed "manufacturer management apparatus." In other embodiments, management apparatus 302 can be configured at any suitable locations where devices, or components of the devices are in a condition to be assigned and recorded with unique identifiers. Such locations can include, for example, sites and facilities where devices are ready for shipment, and the like. As used herein, the term "manufacturer" refers to any entity having the authorities to request for identifiers to be assigned to devices, and to record the devices with corresponding assigned identifiers. In some embodiments, a manufacturer is the manufacturer of the devices. In some other embodiments, a manufacturer is a carrier, a service provider, or a dealership with regard to various aspects of device usage and the like.

In this example, identifier assigning apparatus 304 is located at a security platform; and identifier recording apparatus 306 is configured to locate at the manufacturer's site. As described above, a security platform is also configured with tasks of verifying and authenticating device identities. It should be understood that both assigning apparatus 304 and identifier recording apparatus 306 can be configured to reside at any suitable point or location. For example, identifier assigning apparatus 304 can be configured at a standalone server, or a standalone collection of servers, or a cloud service, all of which are independent from but in communication with the security platform which performs device identification verification and/or authentication. For another example, identifier recording apparatus 306 can operate at an independent facility specialized in recording identifiers into devices manufactured from one and/or multiple manufacturers. In some embodiments, a manufacturer can be authorized to operate management apparatus 302, identifier assigning apparatus 304, as well as identifier recording apparatus 306 to assign and record identification information to device 308.

Identifier recording apparatus 306 is configured to receive unique device identifiers generated by identifier assigning apparatus 304 (e.g., the security platform) for devices (e.g., device 308), which is to be assigned and recorded with unique identifiers. Once in receipt of the identifiers from identifier assigning apparatus 304, identifier recording apparatus 3106 is configured to record the received device identifier into device 308. Any suitable techniques can be implemented to record an identifier into device 308. For example, a device identifier can be burned into the chips of the device; stored at the non-volatile memory (e.g., NADN flash memory) of the device, or any technique that allows an identifier to be permanently stored and later retrieved from the device by a user, a software application, another hardware component, and the like.

Identifier assigning apparatus 304 (e.g., the security platform) is configured to generate unique device identifiers that uniquely correspond to and identify devices. As illustrated in further details with reference to FIG. 8, identifier assigning apparatus 304 can be implemented at a server or at a server farm. In some embodiments, identifier assigning apparatus 304 can be implemented at one or more cloud infrastructures. In some embodiments, identifier assigning apparatus 304 can also be implemented as virtual machines distributed at various computing resources to achieve a scalable, adaptable, and load balanced architecture in terms of assigning identifiers.

Identifier assigning apparatus 304 is configured to receive the above-described identifier assignment request transmitted from management apparatus 302, and subsequently to generate a unique device identifier corresponding to device 308. Afterwards, identifier assigning apparatus 304 is further configured to transmit the generated device identifier to identifier recording apparatus 306, which in turn records the unique device identifier into device 308.

Figure 4:
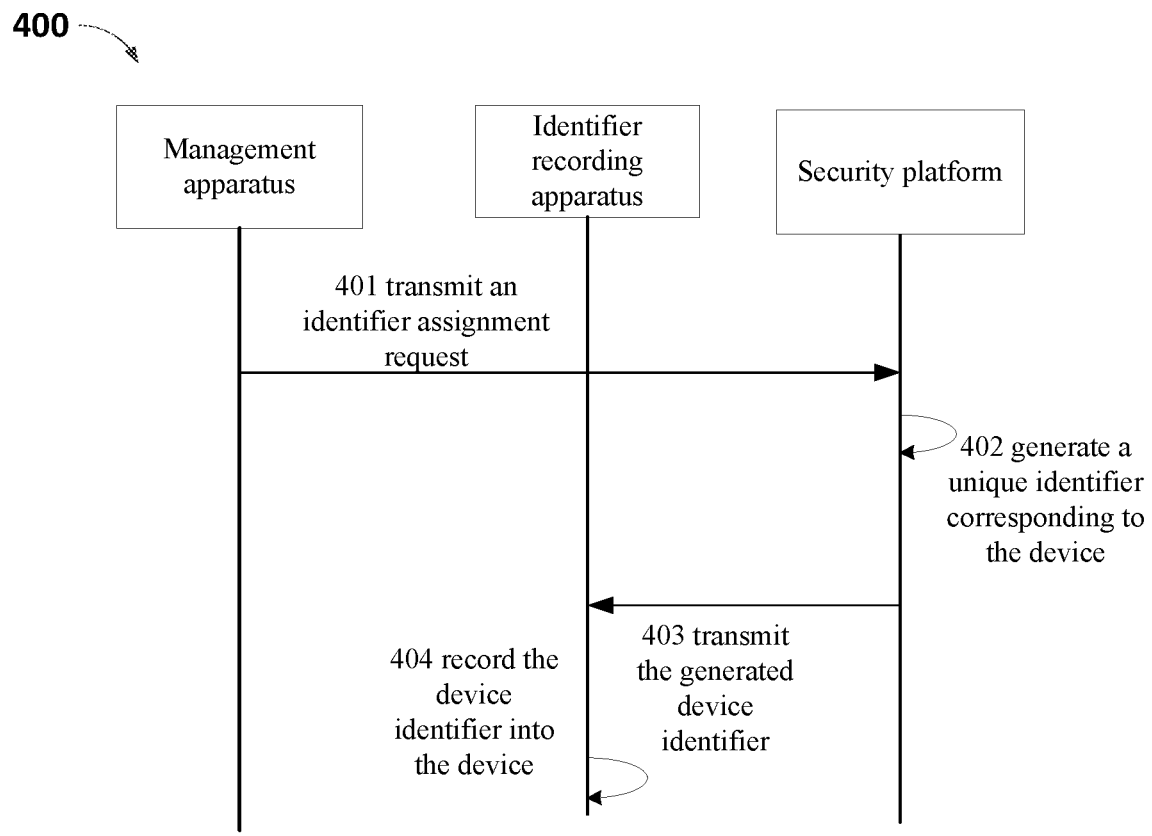
FIG. 4 is a flowchart illustrating an example process for generating device identifiers, in accordance with one or more embodiments of the present disclosure.
Figure 5:
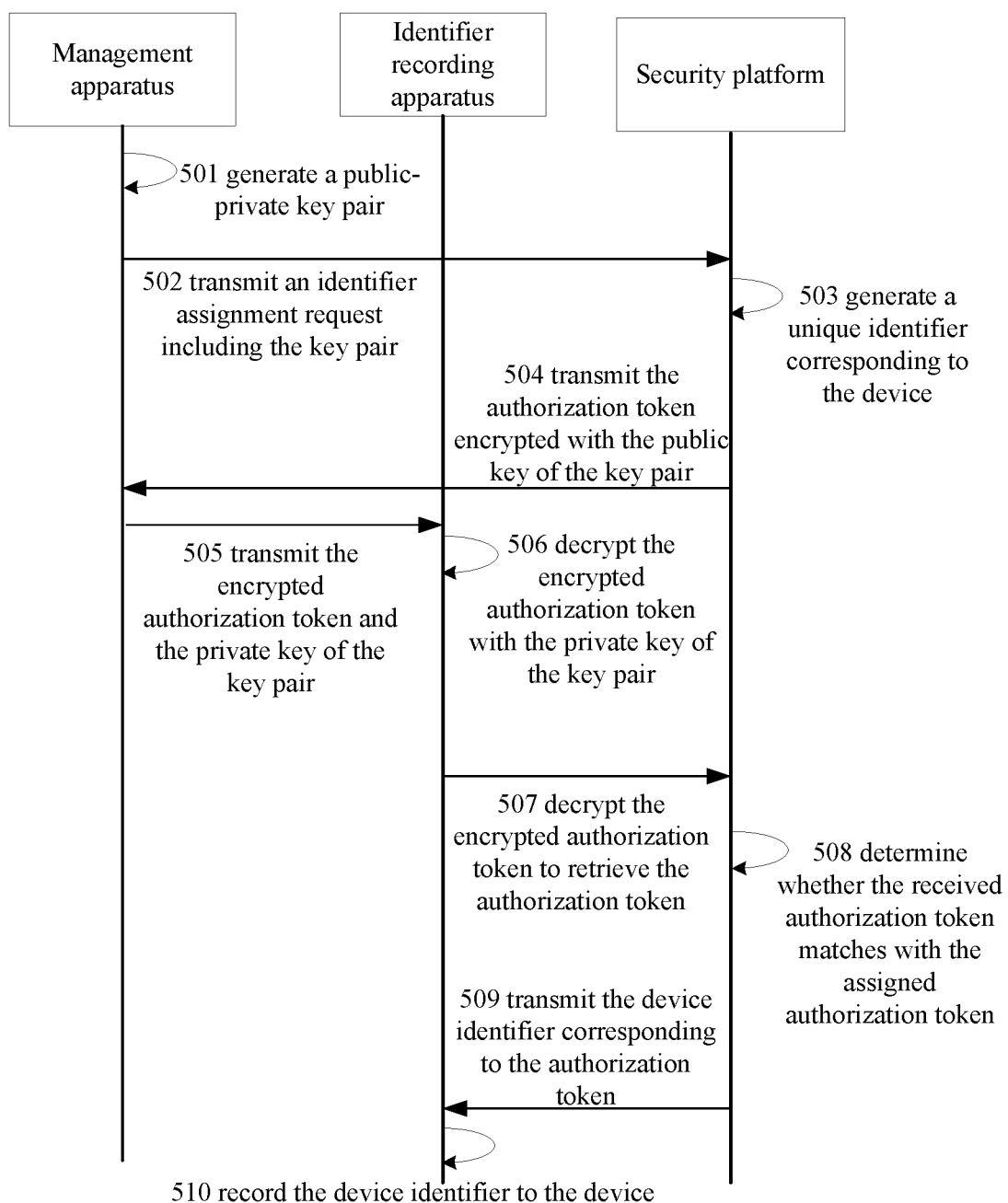
FIG. 5 is a flowchart illustrating another example process for generating device identifiers, in accordance with one or more embodiments of the present disclosure.

In this example with reference to FIGS. 4-5, management apparatus 302 is illustrated from the perspective of a manufacturer management apparatus; and identifier assigning apparatus 304 is illustrated from the perspective of a security platform. In various embodiments, a security platform can be configured at a standalone server, or a standalone collection of servers, or a cloud infrastructure.

FIG. 4 illustrates a flowchart of an example process for generating device identifiers in accordance with an embodiment of the present disclosure. Process 400 can be implemented by, for example, system 300 of FIG. 3.

Process 400 starts at 401, where a management apparatus transmits an identifier assignment request to a security platform.

The identifier assignment request can be configured to include information that can be utilized by the security platform to generate unique device identifiers. In some embodiments, the identifier assignment request includes various information relating to the device to be assigned and recorded with a unique identifier. Such device information includes, for example, device model information, system version (e.g., operating system version and firmware version, etc.) information, identification information (e.g., chip series code) of a chip of the device, and the like. In some other embodiments, the identifier assignment request can also include information pertaining to the quantity of the devices to be assigned with the requested identifiers per identifier assignment request. In some embodiments, the identifier assignment request can include date and time information, as well as geographical information.

At 402, the security platform generates a unique device identifier corresponding to the device that is to be assigned with the identifier.

In some embodiments, the security platform generates a device identifier for the device to be assigned with an identifier based on the above-described device information that is included in the identifier assignment request. The generated device identifier globally and uniquely identifies a particular device such that the particular device can be distinguished from other devices based on the generated identifier. Any suitable technique for generating unique identifiers can be used herein without limitation. An example process to generate device identifiers is illustrated in further details below with reference to FIG. 5.

In some embodiments, when the device information is not available, the security platform uses other ways to generate device information. For example, it can use generated random numbers in place of the device information. In implementation, any information technique can be applied herein so long as it ensures the uniqueness of the generated information (e.g., the device information) that is to be utilized in the process of generating device identifiers.

In some embodiments, in addition to or instead of generating device identifiers in response to (e.g., in real time response to) receiving identifier assignment requests, the security platform is further configured to generate a pool of unique identifiers beforehand. This way, upon receiving an identifier assignment request, the security platform assigns one device identifier out of the pool of identifiers as the unique device identifier corresponding to the request and to the device to be assigned with the identifier.

At 403, the security platform transmits the generated device identifier to an identifier recording apparatus.

In some embodiments, the security platform transmits the generated device identifier directly to the identifier recording apparatus. In some other embodiments, the security platform transmits the generated device identifier to the management apparatus, which in turn transmits the generated device identifier to the identifier recording apparatus.

At 404, the identifier recording apparatus records the generated device identifier into the device to be assigned with the identifier.

In some embodiments, the identifier recording apparatus is configured to record the device identifier to the chip of the device by storing the identifier to a non-volatile memory of the chip, or using other suitable technique that allow an identifier to be permanently recorded and later retrieved. A device identifier recorded into a device is permanently associated with the device and cannot be altered. When it is necessary or needed, the device or other entities can inquire about the device identifier and use the identifier to validate the identify and the legitimacy of the device.

As shown in herein, a device manufacturer is no longer required to be in charge of generating device identifiers for the device manufactured thereby. In contrast to various manufacturers being tasked to recording identifiers to manufactured devices, the generating of device identifiers is centralized at a network-connected entity such as a security platform, which is also configured with other tasks such as to verify and authenticate user identities and/or device identities. This way, a security platform is configured to uniformly generate and maintain records of unique device identifiers for various devices manufactured by various manufacturers. In other words, it is the security platform that stores and maintains the information proving the legitimacy of individual devices in a uniform manner.

FIG. 5 illustrates a flowchart of another example process for generating device identifier in accordance with an embodiment of the present disclosure. Process 500 can be implemented by, for example, system 300 of FIG. 3. Process 500 starts at 501, where a management apparatus at the manufacturer side is configured to generate a public-private key pair (e.g., RSA key pair).

At 502, the management apparatus is configured to include both the device information and the public key of the public-private key pair in an identifier assignment request, and transmit the request to a security platform.

At 503, the security platform is configured to generate a unique device identifier corresponding to the device to be assigned with an identifier, as well as an authorization token, which is described in further detail in below.

In some embodiments, the identifier assignment request includes the information of the number of devices to be assigned with identifiers per identifier assignment request. If the information indicates that there is more than one device to be assigned with an identifier, e.g., n devices, the security platform generates n device identifiers corresponding to the n devices. In some embodiments, an authorization token is individually generated for each of the n devices to be assigned with identifiers. In some other embodiments, a single authorization token is generated for the collection of the n devices to be assigned with identifiers. In some embodiments, the security platform is further configured to maintain a mapping relationship between the generated device identifiers and the corresponding authorization tokens.

In some embodiments, a pre-configured rule or policy is utilized to generate unique device identifiers. Any suitable techniques can be implemented herein as long as the uniqueness of device identifiers are achieved across devices. For example, a pre-configured rule can specify a device identifier to be generated in a specific format to represent an individual device uniquely. The data format can be defined to include, for example, a field of a number of bytes describing the device type, e.g., mobile phone devices, IoT (Internet of Things) devices, in-vehicle devices, etc.; a field of a number of bytes describing the manufacturer of the device or a representation of the manufacture of the device; and a field of a number of bytes describing serial code of a chip of the device. In some embodiments, the data format is extensible.

In some embodiments, an example device identifier is defined in the format of a multi-bit string of characters and/or digits at a length of 17, and stored in 8 bytes. Such format can be defined as, for example, in the form of "Y-AAAA-BBBB-XXXXXXXX." In this example, the first character "Y" is specified to comprise a designated character (prefix) to indicate that the identifier string is designated as a device identifier. The following four characters "AAAA" are specified in hexadecimal representations to describe a manufacturer (e.g., a serial code designated to indicate the manufacturer). The next four characters "BBBB" are also specified in hexadecimal representations to include information such as a chip model number, or chip series number relating to a chip of the device to be assigned with an identifier. Conventionally, manufacturers of chips assign an identifier to each chip that they create. Also, these four characters can further include information such as a system version number, or the number of devices that are in need of identifier assignment per identifier assignment request. The last eight characters "XXXXXXXX" are specified to encode in hexadecimal representations a series of random numbers.

Any suitable technique can be implemented herein to generate a series of random number without limitation. Although it is generally appreciated that truly random numbers are difficult to generate, in some embodiments, one or more seed or secret seed values can be used to perturb an algorithmic pseudo-random number generator ("PNRG"), allowing the generation of improved random (or pseudo-random) numbers. The one or more seed or secret seed values can be obtained or derived from random information or information pertaining to time, date, and/or geographical data. It should be understood that, according to various embodiments of the present disclosure, a device identifier can be a string of any mummer of digits, any number of characters, and any combination thereof. In some embodiments, device information other than the chip series numbers or the system version information are included in the identifier.

Authorization tokens are generated based on the information such as dates, time, device information, manufacturer information, random numbers, and any combination thereof. Alternatively, in addition to generating authorization tokens in response to (e.g., in real time response to) an identifier assignment request at 303, a pool of pre-created authorization tokens is maintained so that an authorization token designated as assignable can be allocated and assigned at 303. In this implementation, once assigned out of the pool of authorization tokens, that particular authorization token is designated as unassignable in the pool. As described in greater detail below at 309, after the device identifier corresponding to the authorization token is assigned at 309, the authorization token is recycled back to the pool of authorization tokens by, for example, being designated as assignable again in the pool. This way, the authorization tokens in the pool can be assigned out in response to an identifier assignment request again without the need to generate new authorization tokens.

At 504, the security platform encrypts the authorization token with the public key of the public-private key pair received in the identifier assignment request; and subsequently transmits the encrypted authorization token to the management apparatus.

At 505, the management apparatus in turn transmits the received encrypted authorization token and the private key the public-private key pair to an identifier recording apparatus.

At 506, the identifier recording apparatus utilizes the received private key to decrypt the encrypted authorization token such that to retrieve the authorization token.

At 507, the decrypted authorization token is transmitted back to the security platform. As the purpose of encrypting authorization tokens is to ensure data security for the authorization tokens, in some embodiments, the authorization token is encrypted using other suitable security measurements. Nevertheless, in some other embodiments, the authorization token can be transmitted without being encrypted or protected with any security measurements when the identifier assigning process is performed via secure communication channel or path.

At 508, the security platform is configured to determine whether the received authorization token matches with the generated authorization token. If so, process 500 continues onto 509. Otherwise, process 500 concludes here. In some embodiments, an error message is transmitted to the management apparatus or to the identifier recording apparatus, as a result of the process 500 not proceeding to 509.

At 509, the security platform is configured to transmit the device identifier corresponding to the authorization token to the identifier recording apparatus. In some embodiments where the identifier assignment request includes a number of n devices to be assigned with identifiers and where one single authorization token is associated with the n devices, the device identifiers corresponding to the n devices are all transmitted to the identifier recording apparatus.

At 510, the identifier recording apparatus is configured to record the device identifier onto the device that need to be assigned with identifiers. The recording of identifiers is similar to the above-illustrated with reference to 404 of FIG. 4, and is not repeated herein for the simplicity of illustration.

Alternatively, at 509, the security platform is further configured to generate a secret encryption key information and transmit the entire or a part of the encryption key information, along with the device identifier, to the identifier recording apparatus. The identifier recording apparatus in turn records both the received device identifier and the encryption key information (e.g., the complete or the partial encryption key information) into a device (e.g., the chip of the device) that is to be assigned with an identifier. In some other embodiments, the security platform is configured to generate a secret cryptographic key. In addition to safekeeping the secret cryptographic key, the security platform transmits the secret cryptographic key along with the device identifier to the identifier recording apparatus. In some embodiments, the security platform is configured to generate a public-private key pair. In addition to safekeeping the key pair, the security platform transmits either the public key or the private key of the public-private key pair along with the device identifier to the identifier recording apparatus, which in turn record both the key and the identifier into the device that is to be assigned with an identifier.

At the identifier recording apparatus side, the device identifier can be recorded together with the above-described encryption related key information into a secure storage of the device to ensure information security. In some embodiments, a secure storage is a secure execution environment that is implemented to securely hosting applications, confidential and cryptographic data, and the like. Any suitable mechanisms can be applied herein without limitation. For example, a secured storage can be implemented by using mechanisms such as ARM TrustZone, Secure Element, Texas Instrument M-Shield™, Intel's TXT (Trusted Execution Technology), or the like. In some embodiments, a secure storage is a virtualized secured execution environment that is implemented by use of mechanisms such as AMD's Secure Virtual Machine, and the like. The recordation of information at a secure storage achieves the goal that, once recorded into a device, the identifier and encryption related information becomes permanently attached to the device, not to be altered or deleted or otherwise tampered with.

It should be noted that at 501, it is the management apparatus that is in charge of generating and safekeeping the encryption key related information. The use of a public-private key pair is to illustrate the example application of asymmetrical encryption algorithm in process 300. According to various embodiments of the present disclosure, any suitable encryption algorithms and mechanisms can be utilized without limitation. For example, when a symmetrical encryption algorithm is utilized, the management apparatus generates a secret key at 501, and at 502, transmits the secret key to the security platform as a part of the identifier assignment request. At 504, the security platform transmits the authentication token to the management apparatus after encrypting the token with the secret key received from the management apparatus. Subsequently at 505, the management apparatus provides the secret key to the identifier recording apparatus so that the identifier recording apparatus uses the secret key to decrypt the encrypted authorization token at 506.

Figure 6:
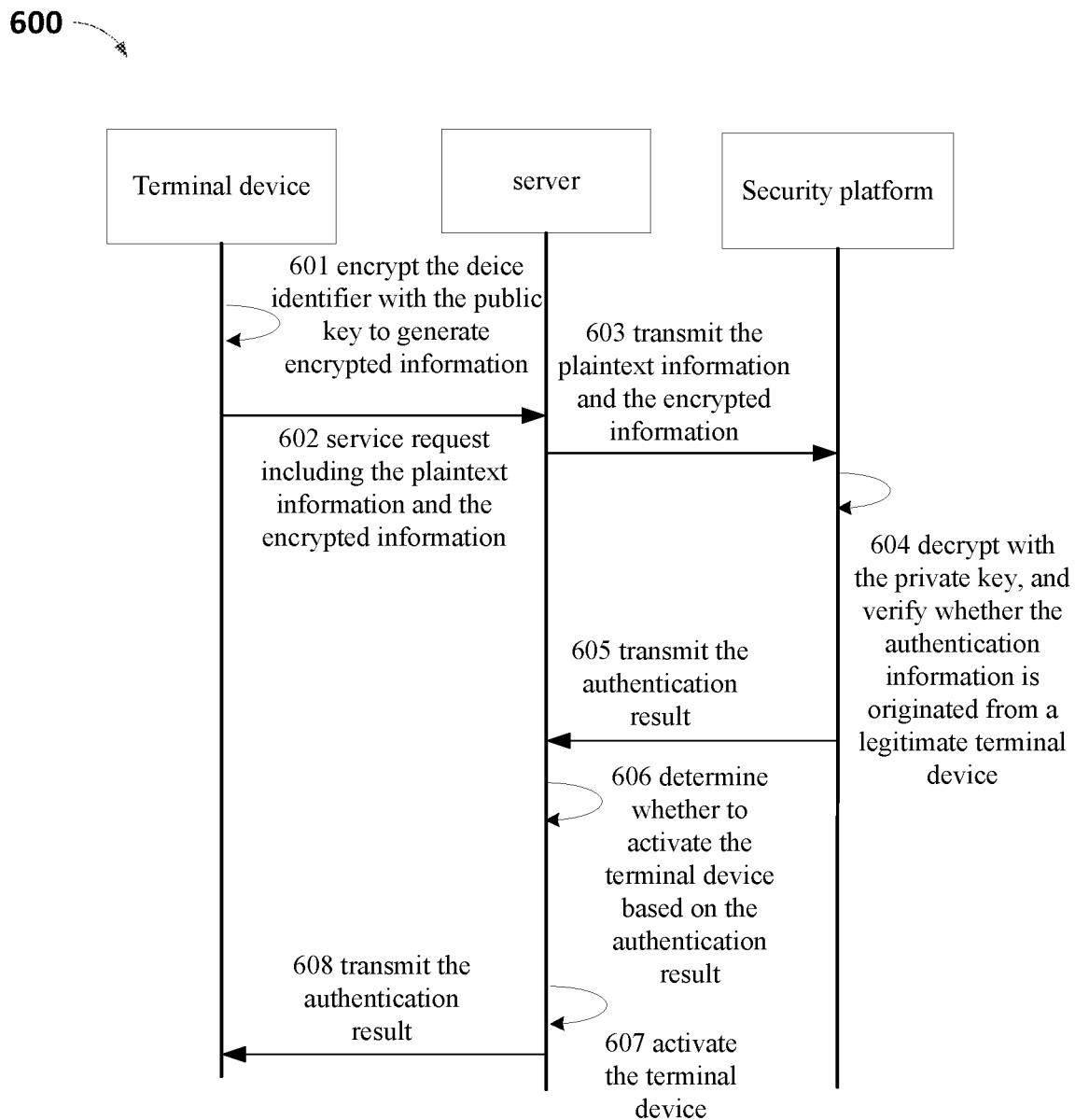
FIG. 6 is a flowchart illustrating an example process for device authentication in connection with a device activation process, in accordance with one or more embodiments of the present disclosure.

FIG. 6 illustrates a flowchart of an example process for device authentication in connection with a device activation process in accordance with an embodiment of the present disclosure. Process 600 can be implemented by, for example, system 100 of FIG. 1.

Process 600 starts at 601, where a terminal device is configured to retrieve a unique device identifier and a public key, and to generate the cryptographic information by encrypting the device identifier with the public key. When powered on for the first time, a terminal device such as a mobile phone is required to go through an activation process. Only an activated device can be properly recognized by the service provider and therefore authorized to access the service provided by the service provider. For example, a smart phone can only be operated by a user after its operating system is activated. In this example, the public key is the public key of the above-described public-private key pair generated by the security platform. In some embodiments, the terminal device is configured to encrypt both the device identifier and a random number to generate the cryptographic information.

At 602, the terminal device is configured to include the plaintext information and the cryptographic information as a value of an activation parameter of the activation request, and transmit the activation request to a server in charge of the activation service. In this example, the plaintext information includes the unique device identifier.

At 603, after receiving the activation request, the server is configured to retrieve the plaintext information and the cryptographic information from the activation request, and in turn transmit the plaintext information and the cryptographic information to a security platform.

At 604, the security platform is configured to decrypt the cryptographic information with the private key, and to determine whether the decrypted cryptographic information matches with the plaintext information in process of consistency verification. If the consistency verification is successful, e.g., the decrypted information matches with the plaintext information, the security center proceeds to verifying whether a received unique device identifier has an entry in the local database or storage of device identifiers. Otherwise, if the consistency verification is unsuccessful, e.g., the decrypted information does not match with the plaintext information, the security platform is configured to transmit the verification result to the server, the verification result indicating that the terminal device has failed the consistency verification.

Referring back to the case where the consistency verification is successful, the security platform in configured to determine whether the received unique device identifier is stored locally on the security platform. If so, the security platform determines the unique device identifier as being originated from a legitimate terminal device. In other words, the terminal device that sent the activation request is legitimate and is allowed to be activated accordingly.

In some embodiments, the activation request is configured to include only the encrypted information as the value of the activation parameter (e.g., information required for authentication). This way, a consistency verification is no longer needed.

At 605, the security platform is configured to transmit the verification result to the server.

At 606, the server is configured to determine whether to activate the terminal device based on received the verification result. If the received verification result indicates that the terminal device requesting activation is authenticated as legitimate, the server is configured to perform the activation process for the terminal device at 607. At 608, the server transmits an activation result to the terminal device.

If the verification result indicates that the consistency verification is not successful, the server is configured to transmit the verification result to the terminal device. At this point, the terminal device is configured to re-transmit the activation request to the server. If the verification result indicates that the terminal device requesting activation is not authenticated as legitimate, the server is configured to deny the terminal device to participate in the activation process.

Figure 7:
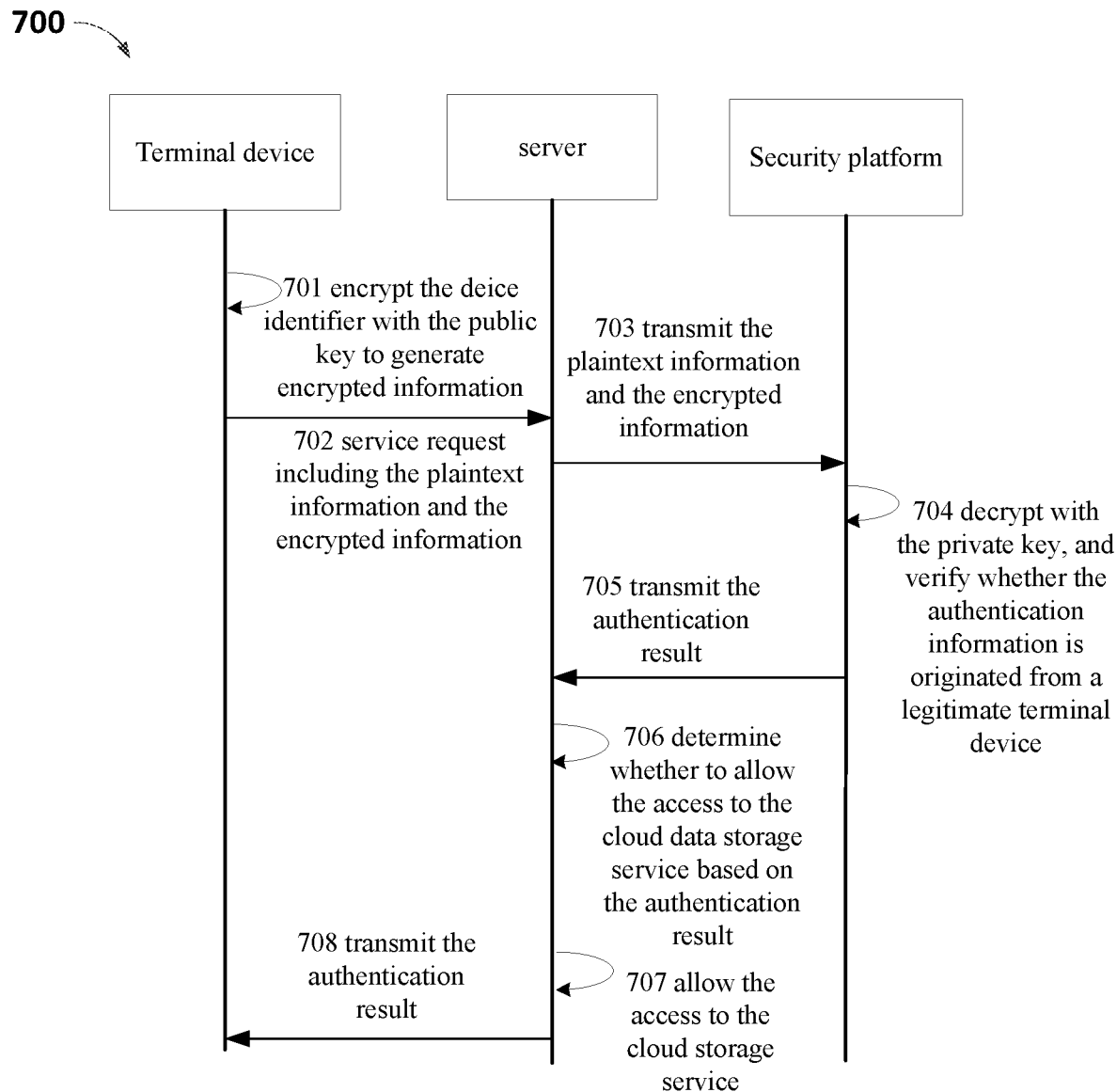
FIG. 7 is a flowchart illustrating an example process for device authentication in connection with a cloud data storage service, in accordance with one or more embodiments of the present disclosure.

FIG. 7 illustrates a flowchart of an example process for device authentication in connection with data storage service at a cloud, in accordance with an embodiment of the present disclosure. Process 700 can be executed in response to a terminal device, such as a mobile device, requesting to upload the local data to a cloud service for storage. Process 700 can be implemented by, for example, system 100 of FIG. 1.

At 701, a terminal device is triggered to retrieve the unique device identifier and the public key, both of which have been previously recorded into the terminal device. The terminal device is further configured to encrypt the device identifier with the public key to generate the cryptographic information. In this example, the public key is the public key of the above-described public-private key pair generated by the security platform.

At 702, the terminal device is configured to transmit the plaintext information and the cryptographic information as the value of the parameters (e.g., the authentication information) in a service request to a server of the cloud storage service. In this example, the plaintext information is configured to include the unique device identifier.

At 703, after receiving the cloud service request, the server is configured to obtain the plaintext information and the cryptographic information from the cloud service request, and to transmit the plaintext information and cryptographic information to a security platform.

At 704, the security platform is configured to decrypt the cryptographic information with the private key, and to compare the decrypted information with the received plaintext information to perform a consistency verification. If the consistency verification is successful, the security platform is configured to proceed to verifying whether the received unique device identifier has an entry in the local database or storage of device identifiers.

In this example, the private key is the private key of the above-described public-private key pair generated by the security platform. The security platform is configured to decrypt the received encrypted information with the private key. During the process of consistency verification, if the decrypted information matches with the received plaintext information, the consistency verification is considered successful, and the security center proceeds to verifying whether a received unique device identifier has been locally recorded. Otherwise, if the decrypted information does not match with the plaintext information, the consistency verification is considered unsuccessful, and the security platform is configured to transmit the verification result to the server, the verification result indicating that the terminal device has failed the consistency verification.

In the case where the consistency verification is successful, the security platform in configured to determine whether the received unique device identifier is stored locally on the security platform. If so, the security platform determines the unique device identifier as being originated from a legitimate terminal device. In other words, the terminal device that sent the cloud service request is legitimate and is allowed to access the cloud storage accordingly.

In some embodiments, the cloud service request is configured to include only the encrypted information as the service request parameter (e.g., information required for accessing the cloud storage). This way, a consistency verification is no longer needed.

At 705, the security platform is configured to transmit the verification result to the server.

At 706, the server is configured to determine whether to permit the terminal device to access the cloud storage service based on the verification result. The requested cloud service can include, for example, to upload local data to the cloud storage, to download the data stored at the cloud storage to the terminal device, and the like. If the verification result indicates that the terminal device requesting the access to the cloud storage is authenticated as legitimate, the server is configured to allow the terminal device the requested access to the cloud storage at 707. At 708, the server is configured to transmit a processing result to the terminal device.

If the verification result indicates that the consistency verification is not successful, the server is configured to transmit the verification result to the terminal device; and the terminal device is configured to re-transmit the cloud service request. If the verification result indicates that the terminal device requesting the cloud service is authenticated as illegitimate, the server is configured to deny the terminal device the requested access to the cloud service.

Figure 8:
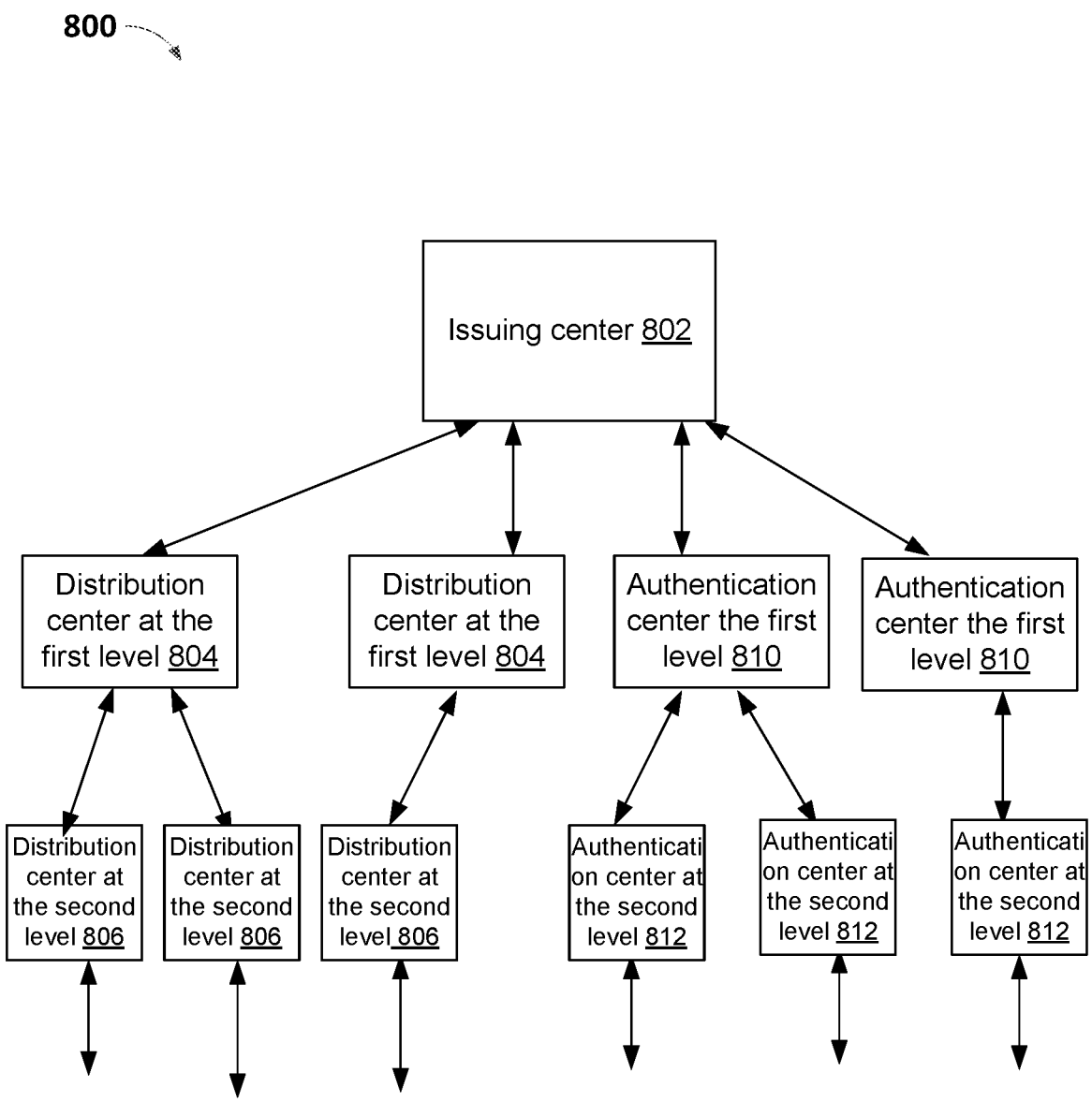
FIG. 8 is a schematic diagram illustrating an example architecture of a security platform for device authentication, in accordance with one or more embodiments of the present disclosure.

FIG. 8 illustrates a structural diagram of an example architect of a security platform in accordance with an embodiment of the present disclosure. In this example, the security platform is configured to comprise a server farm. As shown herein, a security platform 800 includes an issuing center 802, one or more distribution centers 804 and 806 at various distribution levels, and one or more authentication centers 810 and 812 at various authentication levels. For simplicity of illustration, only two distribution levels and two authentication levels are illustrated, and it should be understood that any number of distribution levels, any number of authentication levels, any number of corresponding distribution centers, any number of authentication centers, and any number of issuing center 802 can be included in security platform 800 without limitation.

In some embodiments, as shown herein, distribution levels are configured as the same as authentication levels. In some embodiments, distribution levels are configured differently from authentication levels. In some embodiments, the distribution centers share the locally stored information of device identifiers with the authentication centers at the same level. In some embodiments, authentication centers maintain their copy storage of device identifiers.

With regard to the device identifier generating aspect of the security platform, to prevent the generating of duplicated device identifiers, issuing center 802 is configured to as a centralized entity for issuing identifier generating rules, which is distributed to the corresponding distribution centers 804 and 806 at all levels. Distribution centers 804 and 806 are configured to receive identifier assignment requests from individual manufacturers or individual management apparatus; and subsequently to generate device identifiers based on the identifier generating rules specified by issuing center 802. Distribution centers 804 and 806 are further configured to transmit the generated identifier to the devices for being recorded into the devices. Additionally, distribution centers 804 and 806 at all levels are further configured to submit the generated device identifiers to issuing center 802 for centralized record keeping and maintenance. This way, issuing center 802 is configured to authorize distribution centers 804 and 806 at all the levels to generate device identifiers, while issuing center 802 is only configured to establish and issue the identifier generating rules, as well as to maintain a uniform record of all the generated and reported device identifiers at a centralized entity. In some embodiments, issuing center 802 can store the reported device identifiers and/or related encryption related information in one or more databases.

In some embodiments, issuing center 802 is configured to specify, in the identifier generating rule issued to distribution centers 804 and 806 at all levels, information including, for example, the length of a device identifier, the content corresponding to each field in an identifier, and the like. Take the above-described identifier format of "Y-AAAA-BBBB-XXXXXXXX" for example, in addition to issuing the format of "Y-AAAA-BBBB-XXXXXXXX" in the identifier generating rule to distribution centers 804 and 806 at all levels, issuing center 802 is configured to assign different ranges of the random numbers to different distribution centers 804 and 806, respectively. Accordingly, distribution centers 804 and 806 at all levels are configured to generate random numbers within the specified corresponding ranges, which are in turn used in the process of generating device identifiers. In some embodiments, the levels of distribution centers can be extended in response to a growing number of devices that need to be assigned with identifiers. In this case, the identifier generating rules can be updated accordingly to accommodate additional distribution centers and to ensure no duplicated identifiers are to be generated at distribution centers.

With the use of the collaboration amongst issuing center 802 and various distribution centers 804 and 806 at all levels, the task of generating device identifiers is distributed to various distribution centers 804 and 806, contributing to easing up the requirement of computational power for one single server (issuing center 802) to multiple servers (distribution centers 804 and 806) with load-balancing capabilities. Nevertheless, such tiered architect of security platform 800 also achieves the centralized capabilities to generate unique device identifiers as issue center 802 is in charge of specifying unique identifier generating rules, managing and maintaining a master copy of all the generated device identifiers in a uniform manner, e.g., at issuing center 802. This way, more scalability, efficiency, consistency as well as enhanced security can be provided in the process of device identifier assignment and maintenance.

Alternatively, distribution centers 804 and 806 at all levels are configured to receive identifier assignment requests from a management apparatus, and to forward the identifier assignment requests to issuing center 802. In this example, issuing center 802 is configured to generate device identifiers based on the identifier generating rule, and to forward the generated device identifiers via distribution centers 804 and 806 of all levels to identifier recording apparatus. Issuing center 802 can be configured to comprise a server farm or be implemented based on a cloud infrastructure to ensure proper scalability and load balancing for a central point to assign identifies timely.

With respect to the authentication aspect of the security platform, after receiving the authentication information including a unique device identifier, authentication centers 810 and/or 812 are configured to first determine whether the unique device identifier is stored locally. If so, authentication centers 810 and/or 812 are configured to transmit to an authentication-inquiring server a verification result to indicate that the terminal device from which the authentication information is originated is a legitimate terminal device. Otherwise, authentication centers 810 and/or 812 are configured to forward the authentication information to authentication centers at upper levels. In this example, authentication center 812 is configured to forward such authentication information to authentication center 810; and authentication center 810 is configured to forward such authentication information to issuing center 802, if necessary. The authentication process performed at individual authentication center is substantially similar to the above-described, and therefore the details are not repeated herein for simplicity of illustration.

In the case where the authentication information is forwarded to issuing center 802, issuing center 802 is configured to determine whether the unique device identifier is stored locally. If so, issuing center 802 is configured to transmit to the authentication-inquiring server via authentication centers 810 and 812 at all levels a verification result. The result is configured to indicate that the terminal device from which the authentication information is originated is a legitimate terminal device. Otherwise, issuing center 802 is configured to transmit to the authentication-inquiring server via authentication centers 810 and 812 at all levels a verification result to indicate that the terminal device from which the authentication information is originated is an illegitimate terminal device.

In some embodiments, issuing center 802 is configured to distribute the locally stored device identifiers to authentication centers 810 and 812 at all levels for storage in advance. Alternatively, when a verification result received by an authentication center at an authentication level indicates that the authentication information is originated from a legitimate terminal device, the unique device identifier associated with the authentication information is stored locally at the receiving authentication center. This way, in the future, that authentication center is able to verify the same device identifier received in the authentication information as legitimate on its own, without forwarding such authentication information to authentication centers at the upper level (or issuing center 802).

For example, when in receipt of authentication information, authentication center 812 forwards the received authentication information to authentication center 810, which in turn forwards the received authentication information from authentication center 812 to issuing center 802. Once issuing center 802 determines that the authentication information matches with a legitimate device identifier, the device identifier is passed to authentication center 812 as part of the verification result transmitted from issuing center 802. In some embodiments, authentication center 810 and authentication center 812 are both configured to store a local copy of the verified device identifier. This way, in the future, when authentication center 812 receives the same device identifier in another authentication request, authentication center 812 is able to verify locally that the identifier is legitimate, without having to further forward the authentication information to authentication center 810. Similarly, when an authentication center other than authentication center 812 receives the same device identifier in an authentication request and forwards the authentication information to authentication center 810, authentication center 810 is able to verify locally that the identifier is legitimate, without having to further forward the authentication information to issuing center 802.

Figure 9:
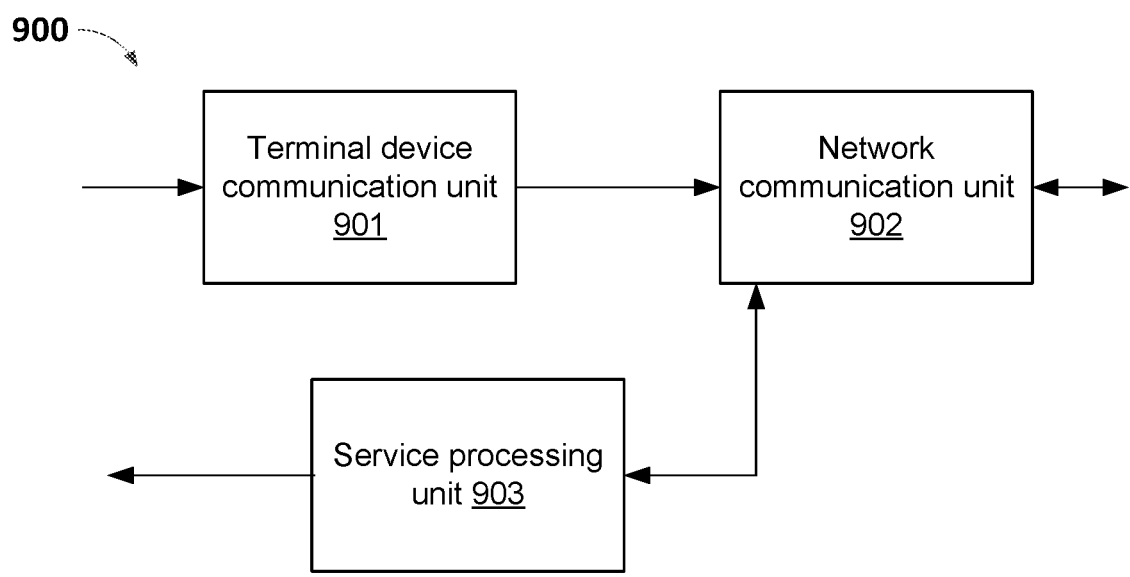
FIG. 9 is a is a functional diagram of an example server for device authentication, in accordance with one or more embodiments of the present disclosure.

FIG. 9 illustrates a functional diagram of an example server for device authentication in accordance with an embodiment of the present disclosure. In this example, server 900 is implemented at a server configured to provide services. In some embodiments, server 900 can also be implemented at any suitable location including a location remote and/or independent from the service providing server. Server 900 includes a terminal device communication unit 901, a network communication unit 902, and a service processing unit 903. Most of the functionalities performed by terminal device communication unit 901, network communication unit 902, and service processing unit 903 are similar to those above-described with references to FIGS. 1-2 and 6-7. Therefore, for simplicity of illustration, details of these functionalities are not repeated herein.

Terminal device communication unit 901 is configured to receive a service request sent by a terminal device, the service request includes authentication information of the terminal device.

Network communication unit 902 is configured to transmit the authentication information to a security platform (not shown). The security platform is configured to verify whether the authentication information is originated from a legitimate terminal device. Network communication unit 902 is also configured to receive a verification result returned by the security platform.

Service processing unit 903 is configured to determine whether to allow the terminal device to access the provided service based on the received verification result. If the verification result indicates that the terminal device is authenticated as legitimate device, service processing unit 903 is configured to allow the terminal device to access the service requested. Otherwise, service processing unit 903 is configured to deny the terminal device from accessing the requested service. In the case where the security platform returns a verification result indicating that the consistency verification is not successful, service processing unit 903 is configured to forward the verification result to the terminal device.

The configuration of the authentication information, and the determination of whether to allow the terminal device to access the provided service is the same as above-described with reference to FIGS. 6-7, and therefore the details are not repeated herein for simplicity of illustration.

The afore-described server configured to provide services can include a server which is configured to provide for any types of service. Such services include, for example, device activation, uploading device data to a cloud storage service, download data such as multimedia data to a device, and the like.

Figure 10:
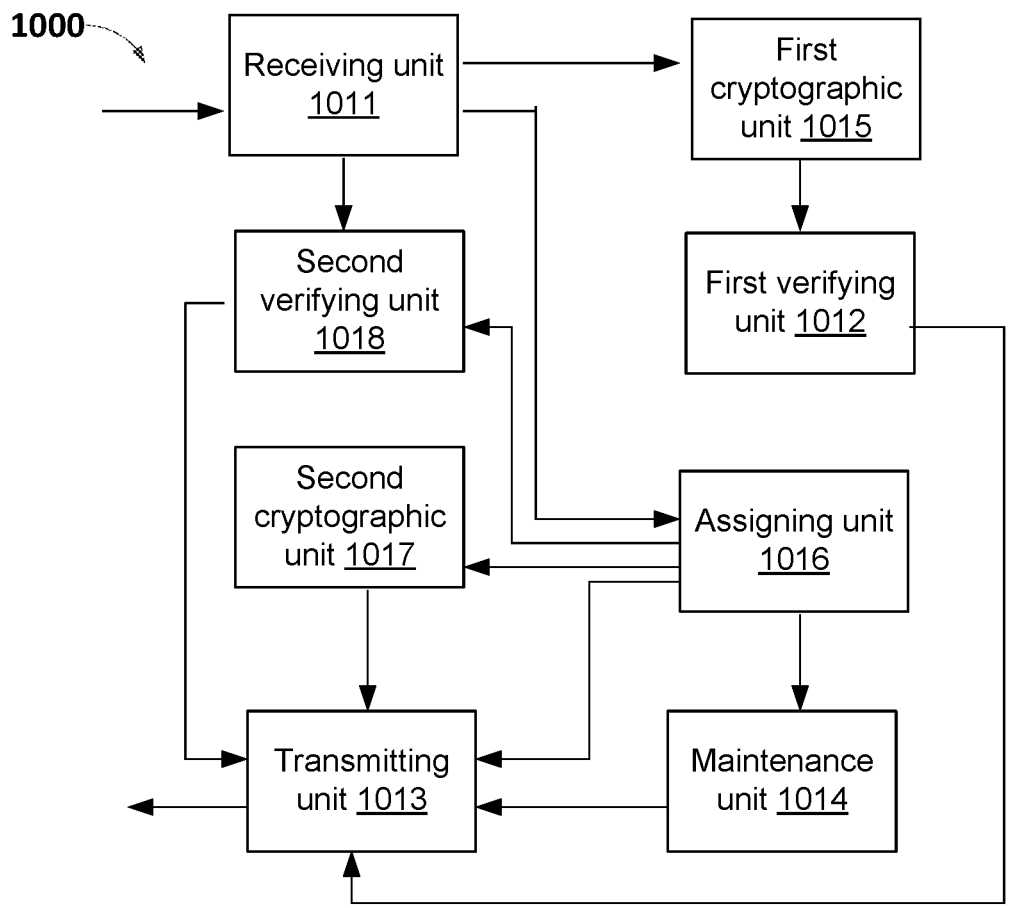
FIG. 10 is a functional diagram of an example security platform for device authentication, in accordance with one or more embodiments of the present disclosure.

FIG. 10 illustrates a functional diagram of an example security platform for device authentication in accordance with an embodiment of the present disclosure. In this example, security platform 1000 includes a receiving unit 1011, a first verifying unit 1012, a transmitting unit 1013, a maintenance unit 1014, a first cryptographic unit 1015, an assigning unit 1016, a second cryptographic unit 1017, and a second verifying unit 1018. Most of the functionalities performed by those afore-mentioned units are similar to those above-described with references to FIGS. 1-2 and 6-7. Therefore, for simplicity of illustration, details of these functionalities are not repeated herein.

Receiving unit 1011 is configured to receive the authentication information transmitted from a server configured to provide services. First verifying unit 1012 is configured to verify whether the authentication information is originated from a legitimate terminal device. Transmitting unit 1013 is configured to transmit a verification result to the server, which in turn determines whether to provide the service to the requesting terminal device based on the received verification information.

Maintenance unit 1014 is configured to store unique device identifiers associated with legitimate terminal devices. First verifying unit 1012 is configured to determine whether the device identifier included in the authentication information matches with any unique device identifiers stored by the security platform. If so, it is determined that the authentication information is originated from a legitimate terminal device.

First cryptographic unit 1015 is configured to generate secret encryption key information and provide the key information to the corresponding legitimate terminal device prior to authenticating any device identity. Additionally, first cryptographic unit 1015 is configured to decrypt the encrypted information with the encryption key information which is stored locally and corresponds to a device identifier. The device identifier is verified in turn by first verifying unit 1012.

The generating of plaintext information and cryptographic information, the consistency verification, the authentication of the device identifier is the same as the above-described with reference to FIGS. 6-7, and therefore the details are not repeated herein.

Assigning unit 1016 is configured to assign unique device identifiers to legitimate terminal devices. Transmitting unit 1013 is configured to transmit the unique device identifier to an identifier recording apparatus so that the identifier recording apparatus records the unique device identifier into the legitimate terminal device.

Receiving unit 1011 is also configured to receive an identifier assignment request for a legitimate terminal device from a manufacturer management apparatus.

The generating of device identifier is the same as the above-described with reference to FIGS. 3-5, and therefore the details are not repeated herein.

Second verifying unit 1018 is configured to verify whether the authorization token received by receiving unit 1011 matches with the authorization token assigned by assigning unit 1016. If so, transmitting unit 1013 is triggered to send the unique device identifier to an identifier recording apparatus.

Cryptographic unit 1017 is configured to use encryption key information included in the identifier assignment request to encrypt the authorization token.

Maintenance unit 1014 is configured to store the mapping relationship between the unique device identifier generated for the legitimate terminal device and the authorization tokens.

Figure 11:
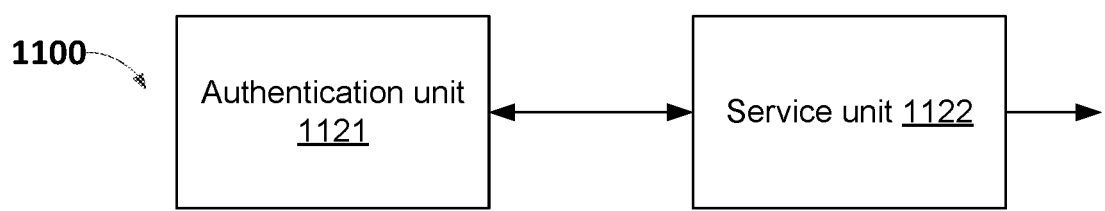
FIG. 11 is a is a functional diagram of an example terminal device for device authentication, in accordance with one or more embodiments of the present disclosure.

FIG. 11 illustrates a functional diagram of an example terminal device for device authentication in accordance with an embodiment of the present disclosure. As shown herein, terminal device 1100 includes an authentication unit 1121, and a service unit 1122. Most of the functionalities performed by authentication unit 1121 and service unit 1122 are similar to those above-described with references to FIGS. 1-2 and 6-7. Therefore, for simplicity of illustration, details of these functionalities are not repeated herein.

Authentication unit 1121 is configured to retrieve authentication information of the terminal device. In general, authentication unit 1121 is triggered by service unit 1122 to retrieve the authentication information. In other words, when a service request is sent by service unit 1122 to a server configured to provide the service, service unit 1122 triggers authentication unit 1121 to retrieve the authentication information.

Service unit 1122 is configured to transmit a service request including the retrieved authentication information to the server.

In some embodiment, authentication unit 1121 is configured to read the unique device identifier recorded into the terminal device. Therefore, the authentication information includes the unique device identifier.

In some embodiments, authentication unit 1121 is also configured to read the encryption key information recorded into the terminal device, and encrypt the unique device identifier with the encryption key information to generate encrypted information. Service unit 1122 in turn includes the encrypted information in the authentication information. Alternatively, service unit 1122 includes a plaintext information including the unique device identifier and the encrypted information to form the authentication information.

Figure 12:
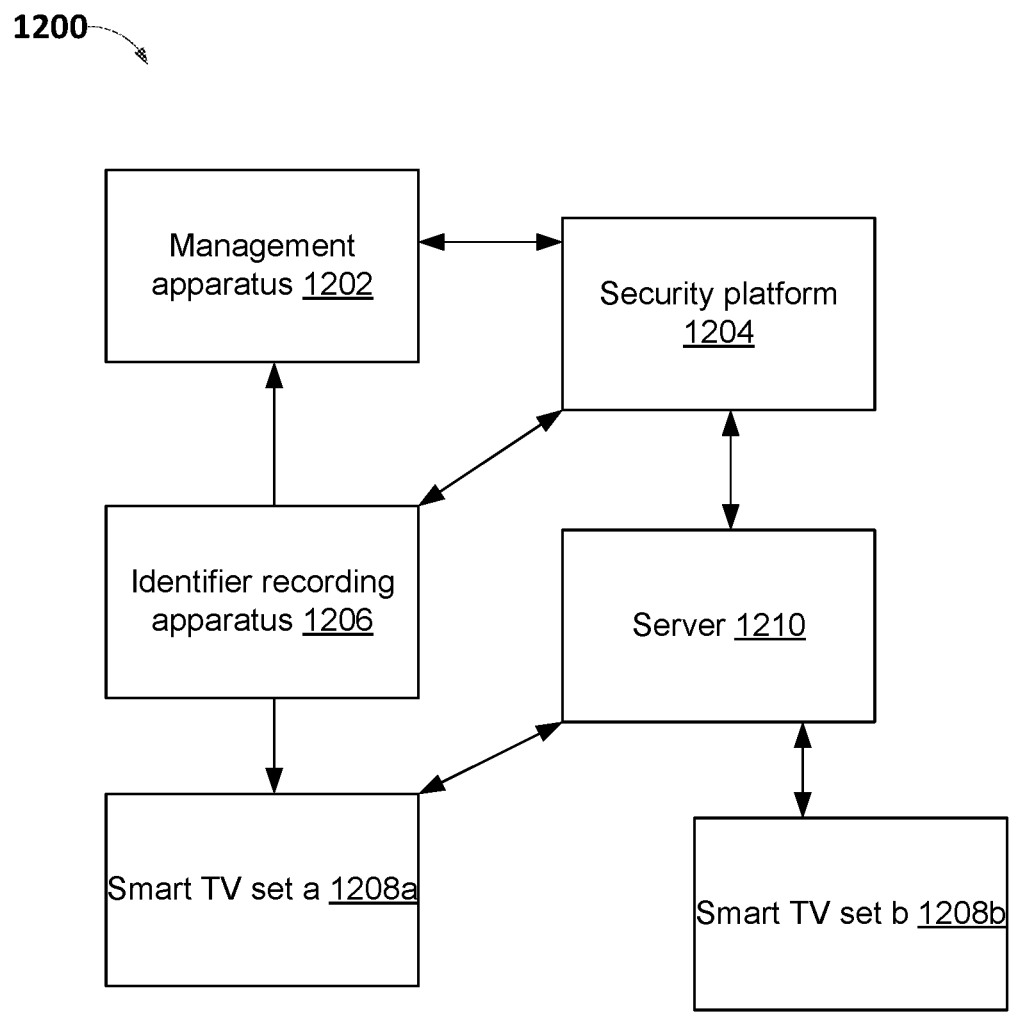
FIG. 12 is a schematic diagram illustrating an example service scenario performing device authentication, in accordance with one or more embodiments of the present disclosure.

FIG. 12 illustrates a schematic diagram of an example service scenario performing device authentication, in accordance with one or more embodiments of the present disclosure. In this example, manufacturer A has manufactured a smart TV set a 1208a, for which the manufacturer management apparatus 1202 generates a public-private key pair (K1-k1). Device information such as the chip model number of a chip of smart TV set 1208a and the public key K1 of the key pair are both included in a device identifier assignment request sent to a security platform 1204.

Security platform 1204 is configured to use the chip model number of smart TV set a 1208a to generate a unique device identifier (IDa), and generate an authorization token. After encrypted with K1, the authorization token is sent to the manufacturer management apparatus 1202. The manufacturer management apparatus 1202 in turn sends the encrypted authorization token and the private key k1 of the above-described key pair to an identifier recording apparatus 1206 at the site of Manufacturer A. After the identifier recording decrypts the authorization token with the private key k1, the identifier recording apparatus sends the decrypted authorization token to security platform 1204.

After receiving the authorization token, security platform 1204 generates a public-private key pair (K2-k2) and sends the public key K2 of the key pair and IDa to the identifier recording apparatus 1206, which in turn records IDa and K2 together into smart TV set a 1208a.

Subsequently, smart TV set a 1208a transmits a service request, e.g., a request to play a video stream, to a server 1210 configured to provide services. The service request includes plaintext information and encrypted information, the plaintext information is configured to include IDa, and the encrypted information is generated by encrypting IDa, random numbers, and other information with the recorded K2.

After receiving the service request from smart TV set a 1208a, server 1210 sends the authentication information, e.g., the afore-described plaintext information and encrypted information included in the service request to security platform 1204.

Afterwards, security platform 1204 uses k2 to decrypt the encrypted information, based on which a consistency verification is performed by comparing the plaintext identifier to the decrypted device identifier. If the consistency verification is successful, security platform 1204 determines whether IDa is stored locally. If so, security platform 1204 sends a verification result indicating that the authentication information is originated from a legitimate terminal device to server 1210. Server 1210 then provides a requested video stream to smart TV set a 1208a.

When a counterfeit TV set b 1208b sends a service request to server 1210, server 1210 similarly sends the authentication information included in the service request to security platform 1204. In this case, the authentication information includes the device identifier IDb corresponding to smart TV set b 1208b. However, smart TV set b 1208b is not in possession of the knowledge of the above-described public key K2 provided by security platform. Therefore, smart TV set b 1208b is not able to generate encrypted information as part of the authentication information. Even if smart TV set b 1208b attempts to generate encrypted information, the encryption key utilized is highly likely not the public key K2. Thus, after security platform 1204 receives this authentication information, the mere lack of encrypted information triggers a failed verification of smart TV set b 1208b. Further, the encryption of the device identifier with a key that is not K2 also results in security platform not being able to decrypt with the private key k2 of the K2-k2 key pair. Therefore, security platform also determines that the verification fails. Even in extreme cases where the public key K2 is compromised for some reasons and becomes available to smart TV set b 1208b, security platform decrypts to obtain the device identifier IDb, which does not match with the device identifier IDa generated by security platform 1204. As a result, security platform again determines that a verification fails.

Thus, security platform 1204 sends to server 1210 a verification result indicating that the authentication information is not originated from a legitimate terminal device. Consequently, server 1210 denies smart TV set b 1208b from access the requested video stream. In other words, by failing authentication, smart TV set b 1208b is not able to be serviced by server 1210 in a normal manner in which legitimate devices are able to.

Figure 13:
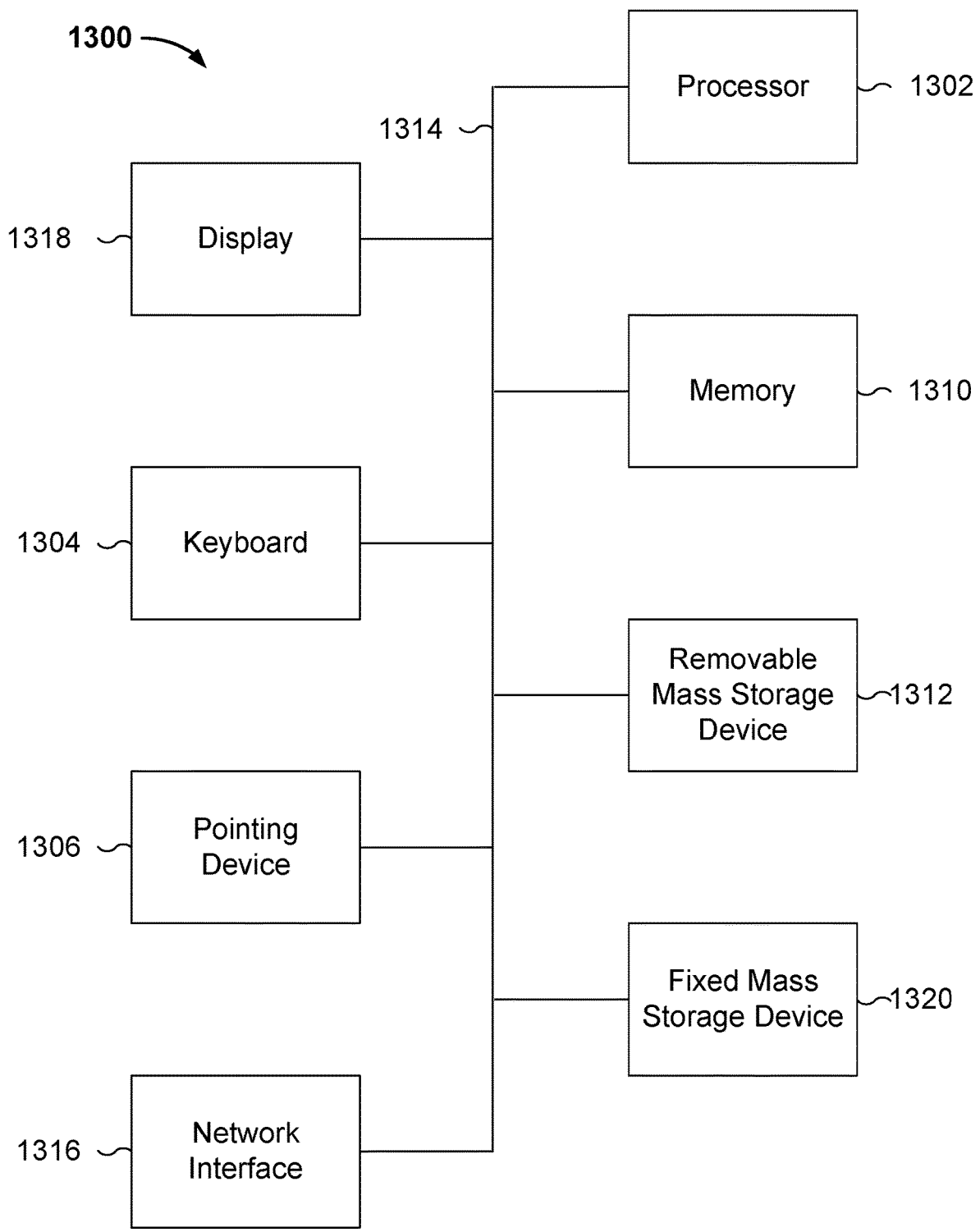
FIG. 13 is a functional diagram illustrating an embodiment of a programmed computer system for device authentication, in accordance with one or more embodiments of the present disclosure.

FIG. 13 is a functional diagram illustrating an embodiment of a programmed computer system for implementing the device authentication. As will be apparent, other computer system architectures and configurations can be used to authenticate device identities. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1202 is a general purpose digital processor that controls the operation of the computer system 1300. Using instructions retrieved from memory 1310, the processor 1302 controls the reception and manipulation of input data, and the output and display of data on output devices (e.g., display 1318). In some embodiments, processor 1302 includes and/or is used to provide the launch of a client application based on a message.

Processor 1302 is coupled bi-directionally with memory 1310, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data, and objects used by the processor 1302 to perform its functions (e.g., programmed instructions). For example, memory 1310 can include any suitable computer readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300 and is coupled either bi-directionally (read/write) or uni-directionally (read only) to processor 1302. For example, storage 1312 can also include computer readable media such as magnetic tape, flash memory, PC-CARDS, portable mass storage devices, holographic storage devices, and other storage devices. A fixed mass storage 1320 can also, for example, provide additional data storage capacity. The most common example of fixed mass storage 1320 is a hard disk drive. Mass storage 1312, 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display 1318, a network interface 1316, a keyboard 1304, and a pointing device 1308, as well as an auxiliary input/output device interface, a sound card, speakers, and other subsystems as needed. For example, the pointing device 1308 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology.

Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that the embodiment of the present application can be provided as methods, systems, or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-described are merely embodiments of the present application and do not serve to limit the present application. For persons skilled in the art, the present application may have various alterations and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An authentication method, comprising:
receiving, at a service server, a service request, during an activation process or an authentication process, from a terminal device to access a service, the service request including authentication information, wherein a pool of unique device identifiers is generated by a security platform in advance of receiving an identifier assignment request for the terminal device from a management apparatus, wherein an assigned unique device identifier from the pool of unique device identifiers is selected by the security platform and transmitted to the management apparatus, wherein an encryption key information was provided for the terminal device by the security platform along with the assigned unique device identifier in advance of the activation process or the authentication process in which the terminal device is sending the service request, wherein the assigned unique device identifier and the encryption key information are caused to be recorded into the terminal device, wherein the authentication information is generated by the terminal device based at least in part on the encryption key information, wherein the authentication information includes:
plaintext information including a recorded unique device identifier corresponding to the terminal device, wherein the recorded unique device identifier comprises the assigned unique device identifier; and
cryptographic information including information generated by encrypting information including the recorded unique device identifier corresponding to the terminal device with the encryption key information;
transmitting the authentication information to the security platform, the security platform being configured to verify whether the authentication information is originated from a legitimate terminal device and to transmit a verification result based on the verification, wherein:
a consistency verification is performed on the authentication information by the security platform, including:
the cryptographic information of the authentication information is decrypted by the security platform using the encryption key information, the encryption key information being stored locally at the security platform and corresponding to the terminal device; and
whether the consistency verification is successful is determined by the security platform based at least in part on whether a decryption result from the decryption of the cryptographic information of the authentication information using the encryption key information matches the plaintext information of the authentication information; and
in response to the consistency verification being successful, the verification result is determined by the security platform based at least in part on whether the recorded unique device identifier matches an entry in a storage of device identifiers that is local to the security platform; and
in response to receiving the verification result from the security platform, determining whether to allow the terminal device to access the service.

2. The method of claim 1, wherein the encryption key information being a public key or a private key of a public-private key pair generated by the security platform corresponding to the recorded unique device identifier of the terminal device.

3. The method of claim 1, wherein the determining of whether to allow the terminal device to access the service comprises one of the following:
in response to receiving the verification result indicating that the authentication information is originated from the legitimate terminal device, allowing the terminal device to access the service; or
in response to receiving the verification result indicating that the authentication information is not originated from the legitimate terminal device, denying the terminal device to access the service; or
in response to receiving the verification result indicating failed consistency verification, transmitting a message indicating the failed consistency verification to the terminal device.

4. The method of claim 1, wherein the service comprises:
an activation service for the terminal device, a cloud data storage service, a downloading service of multimedia data, or any combination thereof.

5. An authentication method, comprising:
generating, at a security platform, a pool of unique device identifiers;

receiving an identifier assignment request for a terminal device from a management apparatus;

selecting an assigned unique device identifier from the pool of unique device identifiers;

providing for the terminal device, from the security platform, the assigned unique device identifier and encryption key information corresponding to the terminal device, wherein the assigned unique device identifier and the encryption key information are caused to be recorded into the terminal device;

storing, at the security platform, the encryption key information corresponding to the terminal device;

receiving, during an activation process or an authentication process, authentication information corresponding to the terminal device that has requested to access a service at a service server, wherein the authentication information is generated by the terminal device based at least in part on the encryption key information corresponding to the terminal device, wherein the authentication information includes:

plaintext information including a recorded unique device identifier corresponding to the terminal device, wherein the recorded unique device identifier comprises the assigned unique device identifier; and cryptographic information including information generated by encrypting information including the recorded unique device identifier corresponding to the terminal device with the encryption key information;

verifying whether the authentication information is originated from a legitimate terminal device to generate a verification result, including by:

performing a consistency verification including:

decrypting the cryptographic information of the authentication information using the encryption key information corresponding to the terminal device; and determining whether the consistency verification is successful based at least in part on whether a decryption result from the decryption of the cryptographic information of the authentication information using the encryption key information matches the plaintext information of the authentication information; and in response to the consistency verification being successful, determining the verification result based at least in part on whether the recorded unique device identifier matches an entry in a storage of device identifiers that is local to the security platform; and transmitting the verification result to the service server, wherein the service server is configured to determine whether to allow the terminal device to access the service based at least in part on the verification result.

6. The method of claim 5, further comprising storing one or more unique device identifiers corresponding to respective one or more legitimate terminal devices; and wherein determining the verification result based at least in part on whether the recorded unique device identifier matches the entry in the storage of device identifiers that is local to the security platform comprises:

determining whether the recorded unique device identifier included in the authentication information matches with one of the stored one or more unique device identifiers; and in response to determining that the recorded unique device identifier included in the authentication information matches with the one of the stored one or more unique device identifiers, determining that the authentication information is originated from the legitimate terminal device.

7. The method of claim 6, wherein the stored one or more unique device identifiers are assigned by an identifier assigning apparatus, wherein the identifier assigning apparatus is configured to assign the one or more unique device identifiers to the legitimate terminal devices by:

receiving the identifier assignment request;

generating the assigned unique device identifier based at least in part on device information pertaining to the terminal device according to a pre-configured identifier generating rule, and assigning the assigned unique device identifier to the terminal device, wherein the terminal device is to be assigned with the assigned unique device identifier, wherein the pre-configured identifier generating rule comprises information to specify the assigned unique device identifier in a format comprising a field of a device identifier prefix, a field of a representation of a manufacturer, a field of the device information pertaining to the terminal device, and a field of random numbers; and transmitting the assigned unique device identifier to an identifier recording apparatus, wherein the identifier recording apparatus records the assigned unique device identifier into the terminal device.

8. The method of claim 7, wherein the device information pertaining to the terminal device comprises at least one of the following: model information, system version information, and identification information pertaining to a chip of the terminal device.

9. The method of claim 7, wherein the encryption key information comprises first encryption key information, wherein the identifier assigning apparatus is further configured to:

assign an authorization token corresponding to the terminal device;

transmit the authorization token so that the identifier recording apparatus receives the authorization token;

receive the authorization token from the identifier recording apparatus;

determine that received authorization token matches with the assigned authorization token; and transmit the assigned unique device identifier to the terminal device, wherein the identifier assignment request includes second encryption key information, and wherein the transmitted authorization token is encrypted with the second encryption key information.

10. The method of claim 9, wherein the identifier assigning apparatus is further configured to:

record mapping relationships between the authorization token and corresponding device identifier; and transmit the assigned unique device identifier corresponding to the received authorization token based at least in part on the mapping relationships.

11. The method of claim 7, wherein the identifier assigning apparatus is further configured to:

generate the encryption key information; and transmit an entire copy or a partial copy of the encryption key information together with the assigned unique device identifier, wherein the entire copy or the partial copy of the encryption key information is transmitted when the encryption key information is generated by use of a symmetrical encryption algorithm; and either a public key or a private key of a public-private key pair is transmitted when the encryption key information is generated by use of an asymmetrical encryption algorithm.

12. The method of claim 5, further comprising generating a public-private key pair corresponding to the recorded unique device identifier of the terminal device; and wherein the encryption key information is a public key or a private key of the public-private key pair, and wherein the encryption key information used to decrypt the cryptographic information is the private key or the public key of the public-private key pair.

13. A method, comprising:
retrieving, at a terminal device, encryption key information from a security platform, the encryption key information being stored locally at the security platform and corresponding to the terminal device, wherein a pool of unique device identifiers is generated by the security platform in advance of receiving an identifier assignment request for the terminal device from a management apparatus, wherein an assigned unique device identifier from the pool of unique device identifiers is selected by the security platform and transmitted to the management apparatus, wherein the encryption key information was provided for the terminal device by the security platform along with the assigned unique device identifier in advance of an activation process or an authentication process in which the terminal device is sending a service request, wherein the assigned unique device identifier and the encryption key information are caused to be recorded into the terminal device;
retrieving authentication information, wherein the authentication information is generated based at least in part on the encryption key information, wherein the authentication information includes:
plaintext information including a recorded unique device identifier corresponding to the terminal device, wherein the recorded unique device identifier comprises the assigned unique device identifier; and
cryptographic information including information generated by encrypting information including the recorded unique device identifier corresponding to the terminal device with the encryption key information; and
transmitting the service request to a service server to request access to a service provided at the service server, the service request including the authentication information, wherein the service server being configured to transmit the service request to the security platform, wherein:
a consistency verification is performed on the authentication information by the security platform, including:
the cryptographic information of the authentication information is decrypted by the security platform using the encryption key information, the encryption key information being stored locally at the security platform and corresponding to the terminal device; and
whether the consistency verification is successful is determined by the security platform based at least in part on whether a decryption result from the decryption of the cryptographic information of the authentication information using the encryption key information matches the plaintext information of the authentication information; and
in response to the consistency verification being successful, a verification result is determined by the security platform based at least in part on whether the recorded unique device identifier matches an entry in a storage of device identifiers that is local to the security platform.

14. The method of claim 13, wherein the retrieving of the authentication information comprises:
retrieving the recorded unique device identifier recorded into the terminal device;
retrieving the encryption key information recorded into the terminal device; and
encrypting the recorded unique device identifier with the encryption key information to generate the cryptographic information.

15. A system for device authentication, comprising:
one or more processors configured to:
receive, at the system, a service request, during an activation process or an authentication process, from a terminal device to access a service, the service request including authentication information, wherein a pool of unique device identifiers is generated by a security platform in advance of receiving an identifier assignment request for the terminal device from a management apparatus, wherein an assigned unique device identifier from the pool of unique device identifiers is selected by the security platform and transmitted to the management apparatus, wherein an encryption key information was provided for the terminal device by the security platform along with the assigned unique device identifier in advance of the activation process or the authentication process in which the terminal device is sending the service request, wherein the assigned unique device identifier and the encryption key information are caused to be recorded into the terminal device, wherein the authentication information is generated by the terminal device based at least in part on the encryption key information, wherein the authentication information includes:
plaintext information including a recorded unique device identifier corresponding to the terminal device, wherein the recorded unique device identifier comprises the assigned unique device identifier; and
cryptographic information including information generated by encrypting information including the recorded unique device identifier corresponding to the terminal device with the encryption key information;
transmit the authentication information to the security platform, the security platform being configured to verify whether the authentication information is originated from a legitimate terminal device and to transmit a verification result based on the verification, wherein:
a consistency verification is performed on the authentication information by the security platform, including:
the cryptographic information of the authentication information is decrypted by the security platform using the encryption key information, the encryption key information being stored locally at the security platform and corresponding to the terminal device; and
whether the consistency verification is successful is determined by the security platform based at least in part on whether a decryption result from the decryption of the cryptographic information of the authentication information using the encryption key information matches the plaintext information of the authentication information;

in response to the consistency verification being successful, the verification result is determined by the security platform based at least in part on whether the recorded unique device identifier matches an entry in a storage of device identifiers that is local to the security platform; and in response to receiving the verification result from the security platform, determine whether to allow the terminal device to access the service; and one or more memories coupled to the one or more processors, configured to provide the one or more processors with instructions.

16. The system of claim 15, wherein the encryption key information being a public key or a private key of a public-private key pair generated by the security platform corresponding to the recorded unique device identifier of the terminal device.

17. The system of claim 15, wherein the one or more processors are further configured to:

in response to receiving the verification result indicating that the authentication information is originated from the legitimate terminal device, allow the terminal device to access the service; or in response to receiving the verification result indicating that the authentication information is not originated from the legitimate terminal device, deny the terminal device to access the service; or in response to receiving the verification result indicating failed consistency verification, transmit a message indicating the failed consistency verification to the terminal device.

18. A computer program product, the computer program product being embodied in a non-transitory computer readable storage medium and comprising computer instructions for:

receiving, at a service server, a service request, during an activation process or an authentication process, from a terminal device to access a service, the service request including authentication information, wherein a pool of unique device identifiers is generated by a security platform in advance of receiving an identifier assignment request for the terminal device from a management apparatus, wherein an assigned unique device identifier from the pool of unique device identifiers is selected by the security platform and transmitted to the management apparatus, wherein an encryption key information was provided for the terminal device by the security platform along with the assigned unique device identifier in advance of the activation process or the authentication process in which the terminal device is sending the service request, wherein the authentication information is generated by the terminal device based at least in part on the encryption key information, wherein the assigned unique device identifier and the encryption key information are caused to be recorded into the terminal device, wherein the authentication information includes:

plaintext information including a recorded unique device identifier corresponding to the terminal device, wherein the recorded unique device identifier comprises the assigned unique device identifier; and cryptographic information including information generated by encrypting information including the recorded unique device identifier corresponding to the terminal device with the encryption key information;

transmitting the authentication information to the security platform, the security platform being configured to verify whether the authentication information is originated from a legitimate terminal device and to transmit a verification result based on the verification, wherein:

a consistency verification is performed on the authentication information by the security platform, including:

the cryptographic information of the authentication information is decrypted by the security platform using the encryption key information, the encryption key information being stored locally at the security platform and corresponding to the terminal device; and whether the consistency verification is successful is determined by the security platform based at least in part on whether a decryption result from the decryption of the cryptographic information of the authentication information using the encryption key information matches the plaintext information of the authentication information; and in response to the consistency verification being successful, the verification result is determined by the security platform based at least in part on whether the recorded unique device identifier matches an entry in a storage of device identifiers that is local to the security platform; and in response to receiving the verification result from the security platform, determining whether to allow the terminal device to access the service.

19. The system of claim 15, wherein the service comprises:

an activation service for the terminal device, a cloud data storage service, a downloading service of multimedia data, or any combination thereof.

20. The computer program product of claim 18, wherein the service comprises:

an activation service for the terminal device, a cloud data storage service, a downloading service of multimedia data, or any combination thereof.

* * * * *

UNITED STATES PATENT AND TRADEMARK OFFICE
CERTIFICATE OF CORRECTION

PATENT NO. : 11,178,143 B2
APPLICATION NO. : 15/953074
DATED : November 16, 2021
INVENTOR(S) : Jun Xu It is certified that error appears in the above-identified patent and that said Letters Patent is hereby corrected as shown below:

In the Claims

Column 29, Line 4, Claim 15, after "information;", insert --and--.

Signed and Sealed this
Twenty-sixth Day of April, 2022

Katherine Kelly Vidal
*Director of the United States Patent and Trademark Office*